United States Patent
Yamada

(10) Patent No.: US 7,650,017 B2
(45) Date of Patent: Jan. 19, 2010

(54) GESTURE DETECTING METHOD, GESTURE DETECTING APPARATUS, AND RECORDING MEDIUM

(75) Inventor: Miki Yamada, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 873 days.

(21) Appl. No.: 11/143,719

(22) Filed: Jun. 3, 2005

(65) Prior Publication Data
US 2005/0271252 A1    Dec. 8, 2005

(30) Foreign Application Priority Data
Jun. 8, 2004    (JP) .............................. 2004-169332

(51) Int. Cl.
G06K 9/00    (2006.01)
G09G 5/00    (2006.01)
G06F 3/033   (2006.01)
H04N 7/18    (2006.01)
H04N 9/47    (2006.01)

(52) U.S. Cl. ........................ 382/107; 382/103; 345/156; 348/77; 715/863

(58) Field of Classification Search .................. 382/103, 382/107, 202; 715/863
See application file for complete search history.

(56) References Cited

U.S. PATENT DOCUMENTS 6,128,003 A * 10/2000 Smith et al. .................. 345/157
6,154,558 A * 11/2000 Hsieh .......................... 382/103
6,681,031 B2 * 1/2004 Cohen et al. ................. 382/103
7,036,094 B1 * 4/2006 Cohen et al. ................. 715/863
2004/0056907 A1 * 3/2004 Sharma et al. ............... 345/863
2004/0240708 A1 * 12/2004 Hu et al. ...................... 382/103
2005/0238201 A1 * 10/2005 Shamaie ...................... 382/103

FOREIGN PATENT DOCUMENTS

JP    6-12493       1/1994
JP    2000-163196   6/2000

OTHER PUBLICATIONS

Ashish Kapoor, et al., "A Real-Time Head Nod and Shake Detector", Proc. 2001 Workshop on Perceptive User Interfaces, Nov. 2001, 5 Pages.

* cited by examiner

Primary Examiner—Bhavesh M Mehta
Assistant Examiner—Anthony MacKowey
(74) Attorney, Agent, or Firm—Oblon, Spivak, McClelland, Maier & Neustadt, L.L.P.

(57) ABSTRACT

A gesture detecting apparatus prepares time series data of coordinates of specific part of object gesturing, calculates velocity vector of the specific part from the time series data of coordinates, to obtain time-series velocity vectors, detects dynamic periods when displacement per unit time of the specific part is larger than predetermined value, based on the time-series velocity vectors, acquires each representative velocity vector from velocity vectors in each dynamic period, stores the each representative velocity vector corresponding to the each dynamic period in memory, calculates first intersection angle of two representative velocity vectors stored in the memory, the two representative velocity vectors corresponding to two successive dynamic periods, and detects that the motion of the specific part is reciprocating motion when the first intersection angle is larger than first threshold value.

16 Claims, 20 Drawing Sheets

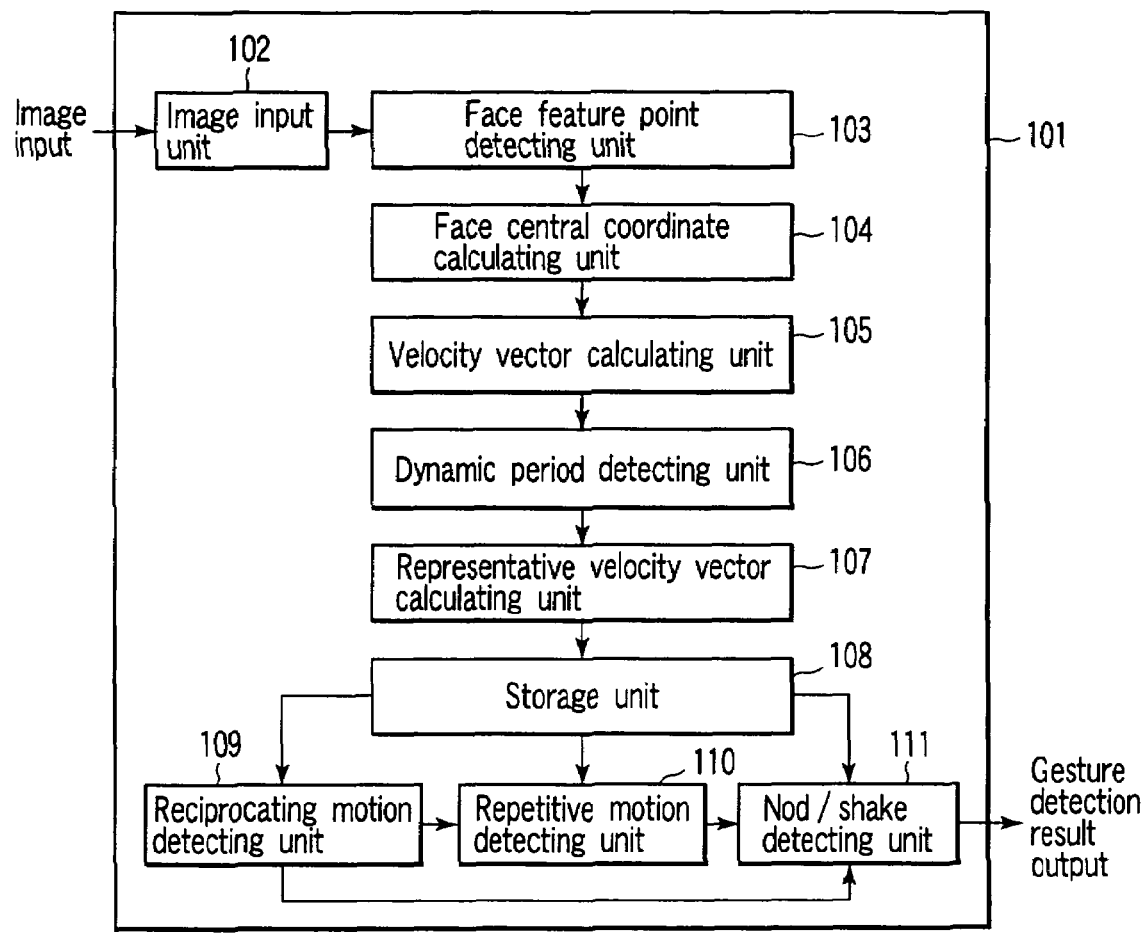
F I G. 1

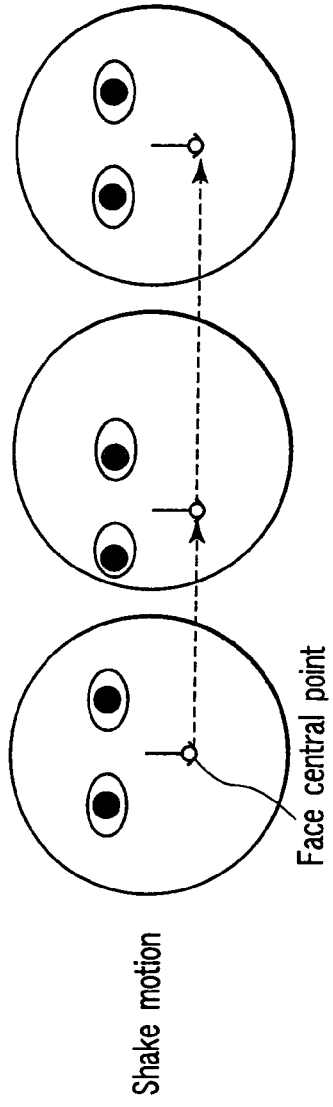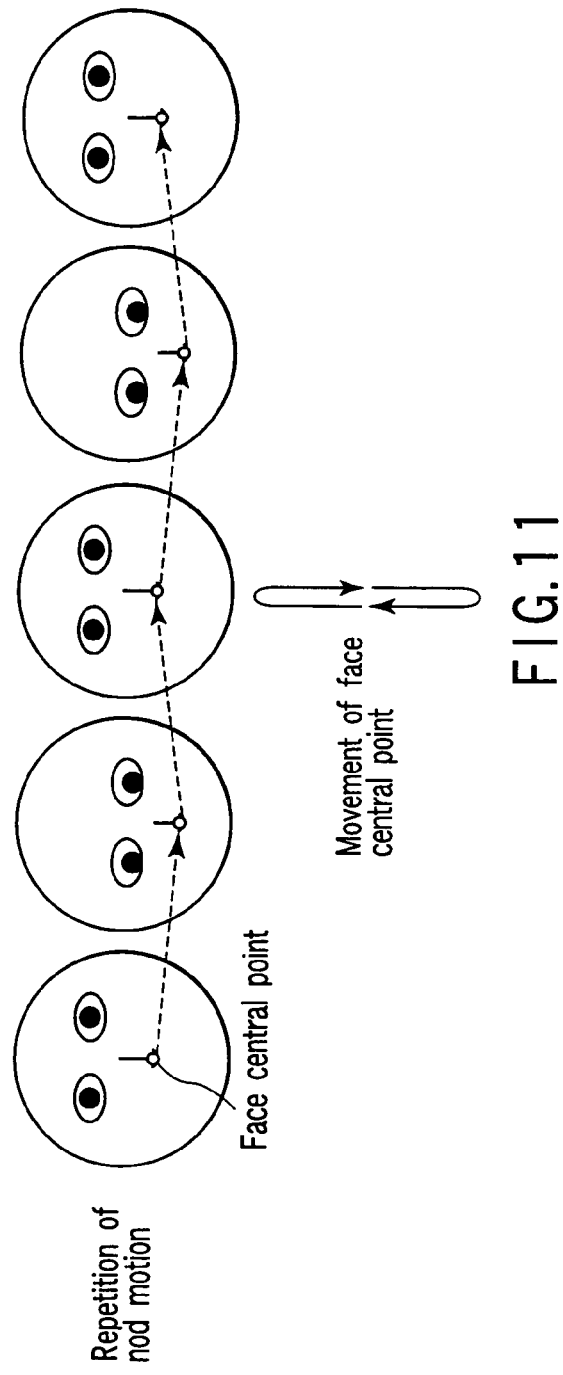

Repetition of nod motion

GESTURE DETECTING METHOD, GESTURE DETECTING APPARATUS, AND RECORDING MEDIUM

CROSS-REFERENCE TO RELATED APPLICATIONS

This application is based upon and claims the benefit of priority from prior Japanese Patent Application No. 2004-169332, filed Jun. 8, 2004, the entire contents of which are incorporated herein by reference.

BACKGROUND OF THE INVENTION

1. Field of the Invention

The present invention relates to a gesture detecting method and apparatus.

2. Description of the Related Art

If human gestures can be automatically recognized, it will be possible to broadly utilize gesture recognition in various fields. Such recognition is applicable to fields such as a household electric appliance which is remotely operated without depending on a remote controller, a user interface of a console terminal, an input interface replacing a keyboard or a mouse, recognition of sign language, an input interface of a game apparatus, and apparatus operation support for a driver.

In a conventional gesture detecting method described in Jpn. Pat. Appln. KOKAI Publication No. 6-12493 (see page 13, FIG. 1), a standard pattern of a gesture to be detected is prepared and stored beforehand, and the stored standard pattern is matched with that of the input gesture to detect the gesture.

A database of the standard pattern has to be prepared, for example, for each user with respect to any gesture to be detected in order to detect the gesture with good precision. Therefore, there has been a problem that great effort is required for the preparation of the standard pattern.

Moreover, even as to the same gesture, if the velocity of a motion is high, pattern matching has to be performed between the standard pattern and the input gesture in consideration of time contraction. Therefore, there has also been a problem that the pattern matching requires a large calculation amount.

Furthermore, there has been a problem that mismatch occurs between the standard pattern and the input gesture by the influence of unexpected noise superimposed upon moving picture data, and erroneous detection of the gesture occurs, even when the standard pattern is prepared with great effort in a case where the motion of a moving specific part is calculated from photographed moving picture data to detect the gesture based on the calculation.

In Jpn. Pat. Appln. KOKAI Publication No. 2000-163196 (see page 10, FIG. 6), a gesture detecting method is described in which no standard pattern is used. In this method, a moving person is regarded as an object, a vertical moving amount of a head is detected, the moving amount is compared with a predetermined threshold value, and it is detected that a nod has been performed in a case where the moving amount exceeds the threshold value.

In this method, even in a case where the object person's head moves as if a V-shaped track were drawn (this cannot be said to be a nod), when the moving amount exceeds a predetermined value in the head's vertical motion, this motion is detected as a nod.

The present invention has been developed in order to solve the above-described problem, and an object is to provide a gesture detecting method and apparatus capable of detecting a gesture from the relationship between velocity vectors of a specific part of an object to robustly detect the gesture with speed and precision.

BRIEF SUMMARY OF THE INVENTION

According to embodiments of the present invention, a gesture detecting apparatus prepares a time series data of coordinates of a specific part of an object gesturing; calculates a velocity vector of the specific part from the time series data of coordinates, to obtain a time-series velocity vectors; detects dynamic periods when displacement per unit time of the specific part is larger than a displacement threshold value, based on the time-series velocity vectors; acquires each representative velocity vector from velocity vectors in each dynamic period; stores the each representative velocity vector corresponding to the each dynamic period in a memory; calculates a first intersection angle of two representative velocity vectors stored in the memory, the two representative velocity vectors corresponding to two successive dynamic periods; and detects that the motion of the specific part is a reciprocating motion when the first intersection angle is larger than a first threshold value.

BRIEF DESCRIPTION OF THE SEVERAL VIEWS OF THE DRAWING

FIG. 1 is a block diagram showing an example of the functional arrangement of a gesture detecting system according to a first embodiment of the present invention;

FIG. 10 is a diagram showing the movement of the face central point in a shake motion of a head;

FIG. 11 is a diagram showing the movement of the face central point in a case where the nod motion is repeatedly performed;

DETAILED DESCRIPTION OF THE INVENTION

Figure 2:
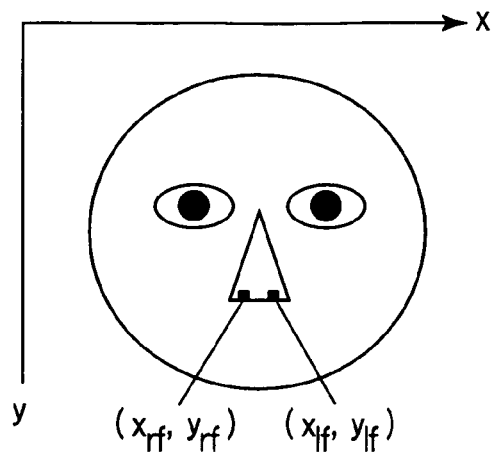
FIG. 2 is a diagram showing a two-dimensional coordinate of a face feature point.

Embodiments of the present invention will be described hereinafter.

First Embodiment

FIG. 1 shows an example of the functional arrangement of a gesture detecting system for realizing a gesture detecting method according to a first embodiment of the present invention. The gesture detecting system according to the present embodiment is a system for detecting gestures which are a nod motion and a shake motion of a person's head which is an object.

A gesture detecting system 101 according to a first embodiment comprises: an image input unit 102; a face feature point detecting unit 103; a face central coordinate calculating unit 104; a velocity vector calculating unit 105; a dynamic period detecting unit 106; a representative velocity vector calculating unit 107; a storage unit 108; a reciprocating motion detecting unit 109; a repetitive motion detecting unit 110; and a nod/shake detecting unit 111. Some or all of these constituting elements may be constituted by hardware or software. The system can be implemented as a computer readable medium storing a computer program that causes a computer to perform the methods recited herein.

Next, a constitution and an operation of the gesture detecting system 101 will be described according to a first embodiment.

The image input unit 102 receives an image of a person (object) captured by a video camera or the like from the outside of the system, converts the image into digital electronic data in such a manner that the image is easily processed to prepare face image data, and sends time series data to the face feature point detecting unit 103. It is to be noted that the face image data at each time will be hereinafter referred to as a frame.

The face feature point detecting unit 103 detects a face feature point for each frame from the time-series face image data sent from the image input unit 102. Here, face feature points refer to user's face feature parts such as eyes, nose, and mouth. As a method of detecting the face feature point from the face image data, a method is usable which is described in Jpn. Pat. No. 3279913.

It is to be noted that face feature points will be described in accordance with nostrils. When the nostrils are detected as the face feature points, as shown in FIG. 2, a coordinate (xrf, yrf) of the right nostril and a coordinate (xlf, ylf) of the left nostril are obtained for each frame. It is to be noted that f is a parameter indicating a frame number.

Next, the face feature points detected by the face feature point detecting unit 103 are the right nostril coordinate (xrf, yrf) and the left nostril coordinate (xlf, ylf), and are sent to the face central coordinate calculating unit 104.

The face central coordinate calculating unit 104 calculates a coordinate of a central point of the face (hereinafter referred to as the face central coordinate) from the right and left nostril coordinates sent from the face feature point detecting unit 103. Here, the face central point refers to a central point between the right and left nostrils, and a face central coordinate (xf, yf) is obtained by equation (1) for each frame.

$$x_f = \frac{x_{rf} + x_{lf}}{2} \qquad (1)$$
$$y_f = \frac{y_{rf} + y_{lf}}{2}$$

The face central coordinate (xf, yf) calculated by the face central coordinate calculating unit 104 is next sent to the velocity vector calculating unit 105.

The velocity vector calculating unit 105 calculates a velocity vector of a movement of the face central point for each frame from the face central coordinate (xf, yf) sent from the face central coordinate calculating unit 104. A velocity vector Vf=(vxf, vyf) of the movement of the face central point is obtained as a displacement of the face central coordinate between frames by equation (2).

$$v_{xf} = \frac{x_{f+1} - x_f}{\Delta t} \quad (2)$$
$$v_{yf} = \frac{y_{f+1} - y_f}{\Delta t}$$

where Δt denotes the time interval between the time when an f-th frame of an image input into the image input unit 102 is captured and the time when an f+1-th frame is captured.

Moreover, in the case where a size of the face appearing in the image for each frame changes, instead of the equation (2), an interval wf+1 between both eyes is obtained in the image of the f+1-th frame, and a normalized velocity vector may be obtained as a velocity vector (vxf, vyf) of the face central coordinate by equation (3).

$$v_{xf} = \frac{x_{f+1} - x_f}{w_{f+1} \Delta t} \quad (3)$$
$$v_{yf} = \frac{y_{f+1} - y_f}{w_{f+1} \Delta t}$$

It is to be noted that the displacement of the face central coordinate between two successive frames is obtained as the velocity vector in the equation (2), but the displacement of the face central coordinate at an appropriate frame interval may be obtained as the velocity vector (vxf, vyf) of the face central coordinate as shown by equation (4).

$$v_{xf} = \frac{x_{f+i} - x_f}{\Delta t'} \quad (4)$$
$$v_{yf} = \frac{y_{f+i} - y_f}{\Delta t'}$$

where Δt' denotes the time interval between the time when an f-th frame of the image input into the image input unit 102 is captured and the time when an f+1-th is captured.

Furthermore, after obtaining the velocity vector of the face central coordinate in the equations (2) to (4), the velocity vector of the face central coordinate is smoothed, and (vxf', vyf') may be obtained as the velocity vector of the face central coordinate as shown in equation (5).

$$v'_{xf} = \frac{1}{2N+1} \sum_{i=-N}^{N} v_{xf+i} \quad (5)$$
$$v'_{yf} = \frac{1}{2N+1} \sum_{i=-N}^{N} v_{yf+i}$$

When the smoothing process is performed in this manner, it is possible to reduce the influence of an error on the velocity vector of the movement of the face central point even in a case where the noise is superimposed upon the face image data to thereby cause the error in the detection of the face feature point in the face feature point detecting unit 103.

The velocity vector Vf=(vxf, vyf) of the movement of the face central point is calculated by the velocity vector calculating unit 105 by any of the equations (2) to (5), and sent to the dynamic period detecting unit 106.

The dynamic period detecting unit 106 detects a time period (dynamic period) in which the face central point performs the motion using the velocity vector of the movement of the face central point sent from the velocity vector calculating unit 105. Here, the dynamic period refers to a time period in which all the magnitudes of the velocity vectors included in this period are larger than a predetermined threshold value. That is, the dynamic period indicates successive periods constituted by a frame which satisfies a condition shown in equation (6) in a case where time series data of the velocity vector is represented by {V1, V2, ..., Vf, ...}.

$$\|Vf\| > TH_v \quad (6)$$

where THv is a predetermined threshold value of the magnitude of the velocity vector. Moreover, ‖Vf‖ indicates the magnitude of the velocity vector Vf=(vxf, vyf) in the f-th frame, and is calculated by equation (7).

$$\|V_f\| = \sqrt{v_{xf}^2 + v_{yf}^2} \quad (7)$$

It is to be noted that here the magnitude of the velocity vector Vf=(vxf, vyf) is obtained by the equation (7), but the magnitude of a specific component of the velocity vector may be simply used as the magnitude of the velocity vector. For example, when the face central point reciprocates in a y-axis direction in FIG. 2, |vxf|<<|vyf| results. Therefore, the dynamic period can be detected by equation (6) using the magnitude vfy of a y-component of the velocity vector Vf as the magnitude of the velocity vector Vf.

The dynamic period detected by the dynamic period detecting unit 106 in this manner is sent to the representative velocity vector calculating unit 107.

The representative velocity vector calculating unit 107 calculates the representative velocity vector from the velocity vector included in the dynamic period with respect to each dynamic period detected by the dynamic period detecting unit 106. Here, the representative velocity vector is a velocity vector whose magnitude is maximum in each dynamic period among the velocity vectors included in the dynamic period. In this case, one dynamic period detected by the dynamic period detecting unit 106 is the period from the fs-th frame to the fe-th frame. Furthermore, assuming that the time series data of the velocity vectors included in the period is {Vfs, Vfs+1, ..., Vfe}, and the representative velocity vector is VR, the representative velocity vector VR is a velocity vector which satisfies equation (8).

$$\|V_R\| > \|V_i\| (i=f_s, \ldots, f_e, i \neq R) \quad (8)$$

Thus, the representative velocity vector calculating unit 107 calculates the representative velocity vector VR every time the dynamic period is detected by the dynamic period detecting unit 106. Moreover, the representative velocity vector VR calculated by the representative velocity vector calculating unit 107 is stored as the time series data in order of appearance in the storage unit 108.

The reciprocating motion detecting unit 109 successively reads the representative velocity vector stored in the storage unit 108, and detects from the representative velocity vectors whether or not the face central point performs a reciprocating motion.

A method will be described hereinafter in which the reciprocating motion of the face central point is detected from the representative velocity vectors in the reciprocating motion detecting unit 109. Here, an example will be described in accordance with the nod motion of the head.

Figure 3:
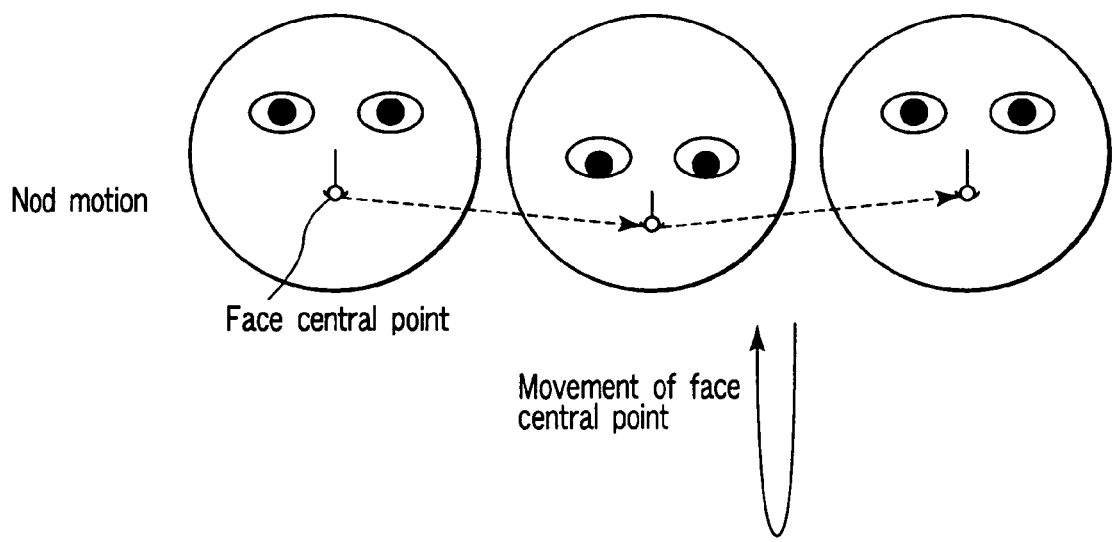
FIG. 3 is a diagram showing movement of a face central point in a nod motion.

The nod motion comprises a motion for nodding (shaking) the head downwards, and an accordingly continuously performed motion for returning the head upwards. That is, when the face central point is noted, the nod motion can be grasped as the vertical reciprocating motion of the face central point as shown in FIG. 3.

Figure 4:
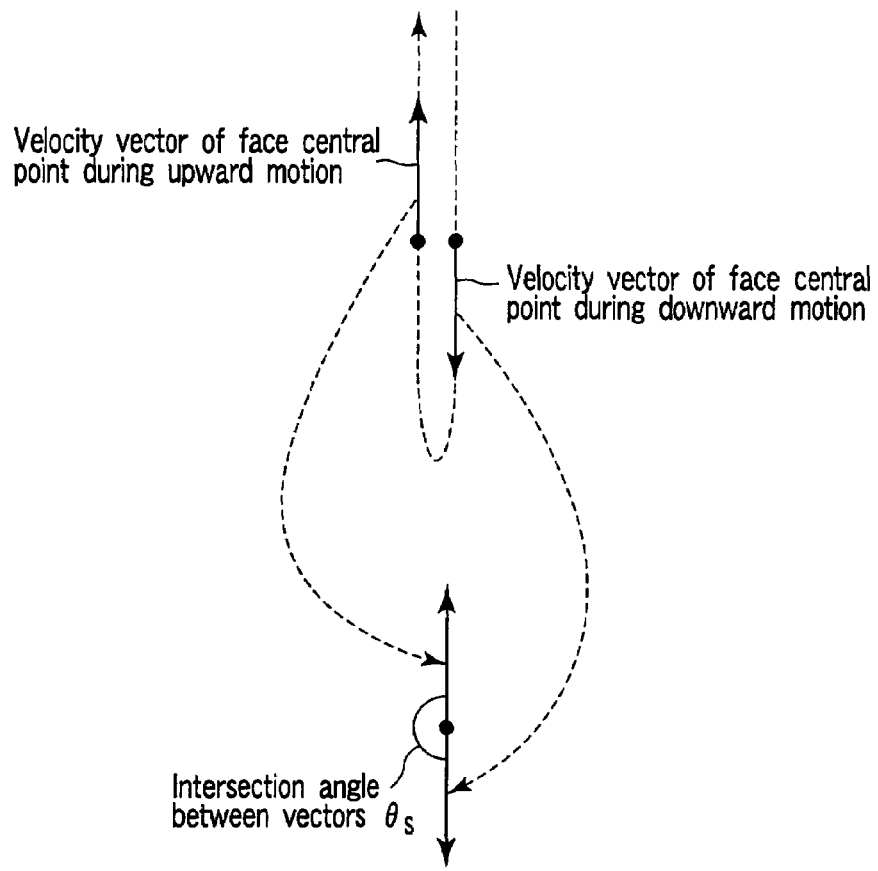
FIG. 4 is a diagram showing an intersection angle between the velocity vectors in the nod motion.

Here, in the vertical reciprocating motion, a direction of the velocity vector of the face central point at an arbitrary time in the downward motion is substantially reverse to that of the velocity vector of the face central point at the arbitrary time in the upward motion as shown in FIG. 4. Therefore, when the relative angle (intersection angle) θS formed by both the velocity vectors is obtained, the intersection angle θS comes close to 180 degrees.

Figure 5:
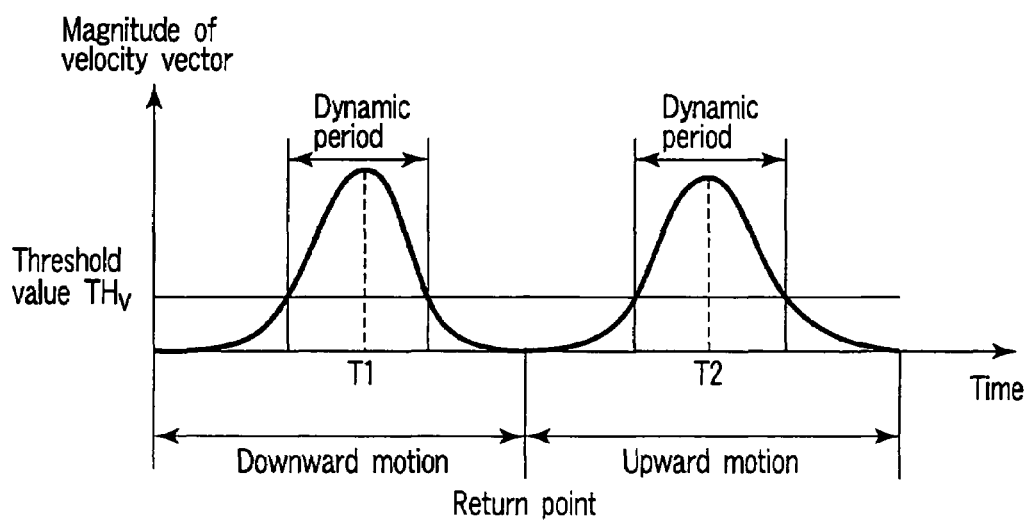
FIG. 5 is a diagram showing a change of a magnitude of the velocity vector of the face central point and a dynamic period in the nod motion.

Next, a change will be described in the magnitude of the velocity vector of the movement of the face central point in the reciprocating motion. FIG. 5 is a diagram showing a change of a magnitude of the velocity vector with time. Before reciprocating motion starts, the face central point has a static state, and the magnitude of the velocity vector is zero. Moreover, when the face central point starts its motion downwards, the magnitude of the velocity vector increases, and reaches a return point via a time T1 when the magnitude of the velocity vector is maximized. At the return point, the motion of the face central point shifts from the downward motion to the upward motion. Therefore, the magnitude of the velocity vector momentarily indicates zero. Thereafter, when the face central point starts its motion upwards, the magnitude of the velocity vector increases again, and returns to its original position to stand still via a time T2 when the magnitude of the velocity vector is maximized.

Here, when the threshold value THv of the equation (6) is set to an appropriate value, as shown in FIG. 5, the dynamic period detecting unit 106 detects two dynamic periods in one nod motion. As described above, the representative velocity vector calculated by the representative velocity vector calculating unit 107 is assumed as the velocity vector whose magnitude is maximum among the velocity vectors included in the dynamic period detected by the dynamic period detecting unit 106. Then, the velocity vectors at the time T1 and time T2 are selected as the representative velocity vectors in FIG. 5. Therefore, the velocity vectors at these times are continuously stored as the representative velocity vector in the storage unit 108.

Moreover, the directions of the velocity vectors at the times T1, T2 stored in the storage unit 108 in this manner are downward at the time T1, and upward at the time T2. Therefore, the intersection angle θS formed by both the velocity vectors is calculated as approximately 180 degrees.

Then, the intersection angle θS is calculated between two successive representative velocity vectors stored in the storage unit 108. When the intersection angle θS is approximately 180 degrees, it is detected that the face central point has performed the reciprocating motion, that is, the nod motion has been performed. Specifically, the intersection angle θS between the representative velocity vectors is compared with a predetermined threshold value ΘS, and it may be detected that the nod motion has been performed in a case where θS≧ΘS. Here, the threshold value ΘS indicates a value of the intersection angle between the representative velocity vectors permitted as the nod motion, and this value is preferably set to 145 degrees or more in order to detect the nod motion of the person who is the object without any mistake.

It is to be noted that instead of the intersection angle between the representative velocity vectors, a cosine (cos θS) of the intersection angle may be obtained and compared with a threshold value THΘS. Assuming that the velocity vectors at the times T1 and T2 are VT1, VT2, respectively, the cosine (cos θS) of the intersection angle can be obtained by equation (9).

$$\cos\theta_s = \frac{V_{T1} \cdot V_{T2}}{\|V_{T1}\|\|V_{T2}\|} \quad (9)$$

where VT1·VT2 indicates an inner product of VT1 and VT2.

In this case, it is detected that the nod motion has been performed in a case where cos θS≦THΘS with respect to the threshold value THΘS to the cosine of the intersection angle.

Figure 6:
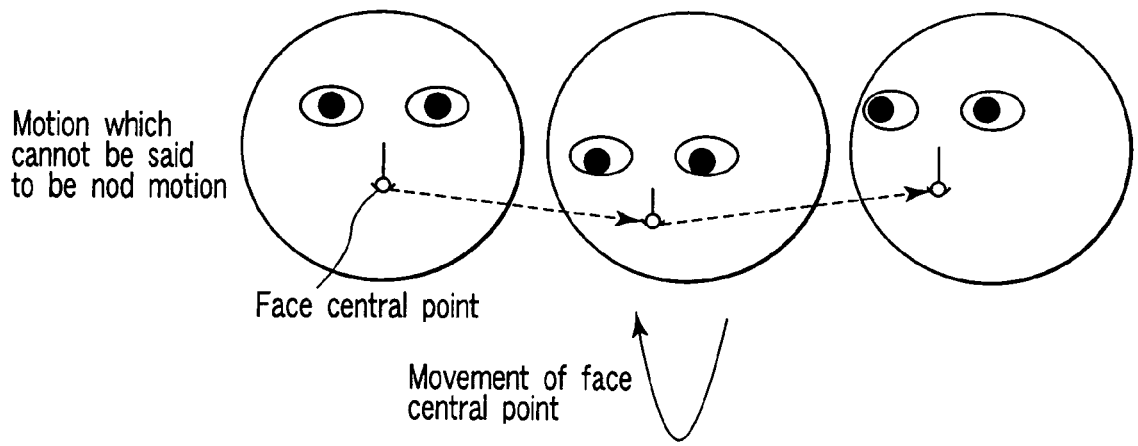
FIG. 6 is a diagram showing the movement of the face central point in a motion which cannot be said to be the nod motion.
Figure 7:
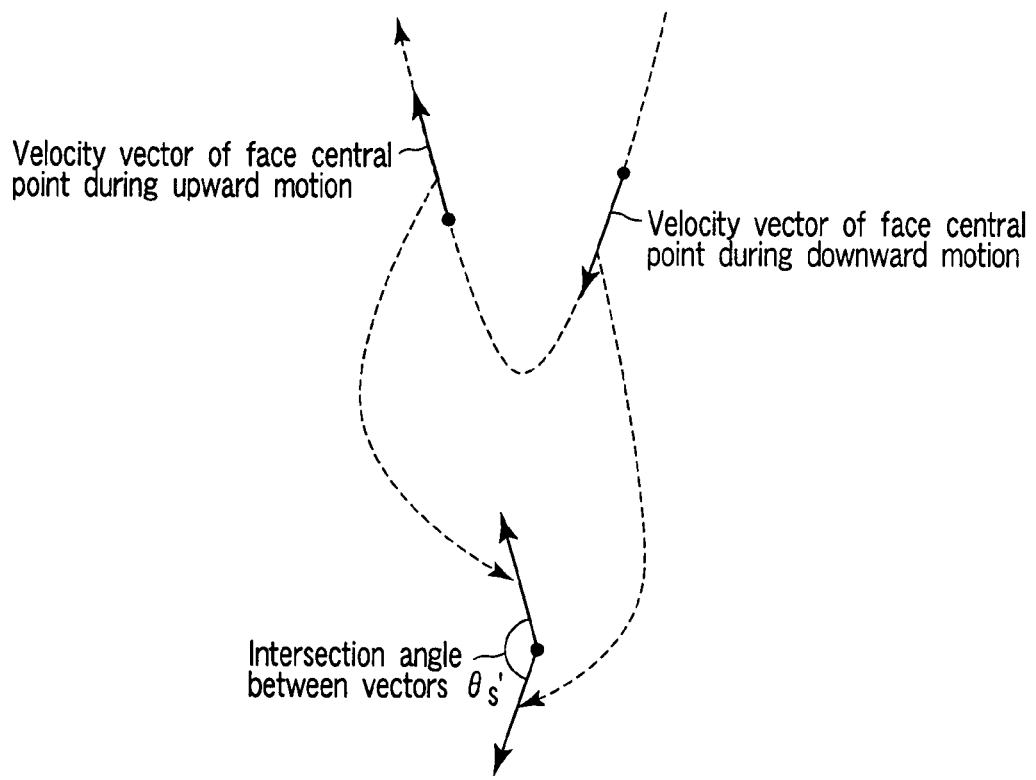
FIG. 7 is a diagram showing the intersection angle between the velocity vector in the motion which cannot be said to be the nod motion.

On the other hand, when the face central point performs such a motion to track a V-shape, and this cannot be said to be a reciprocating motion as shown in FIG. 6, an intersection angle θS' between the representative velocity vectors successively stored in the storage unit 108 is far below 180 degrees as shown in FIG. 7. Therefore, a comparison result with the predetermined threshold value ΘS is θS'<ΘS, and it can be detected that the motion is not a nod motion.

Figure 8:
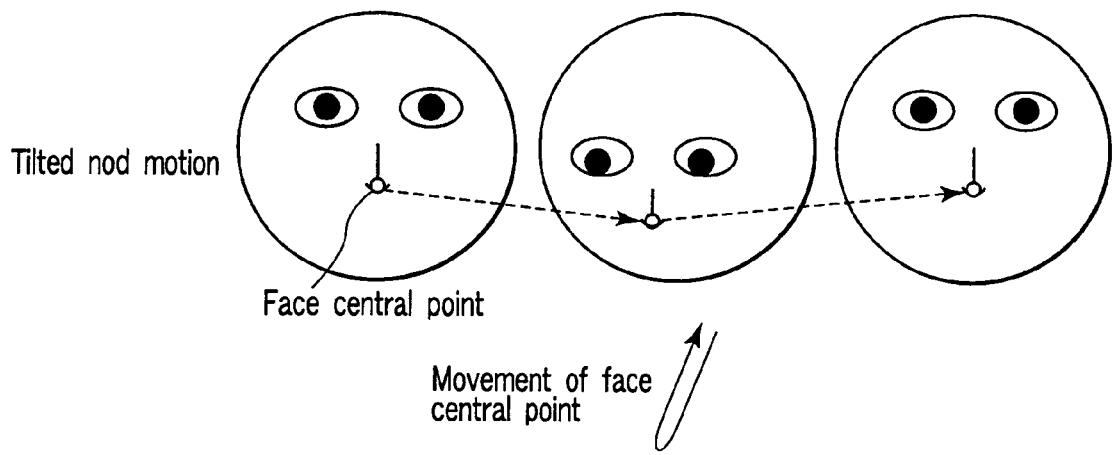
FIG. 8 is a diagram showing the movement of the face central point in a tilted nod motion.
Figure 9:
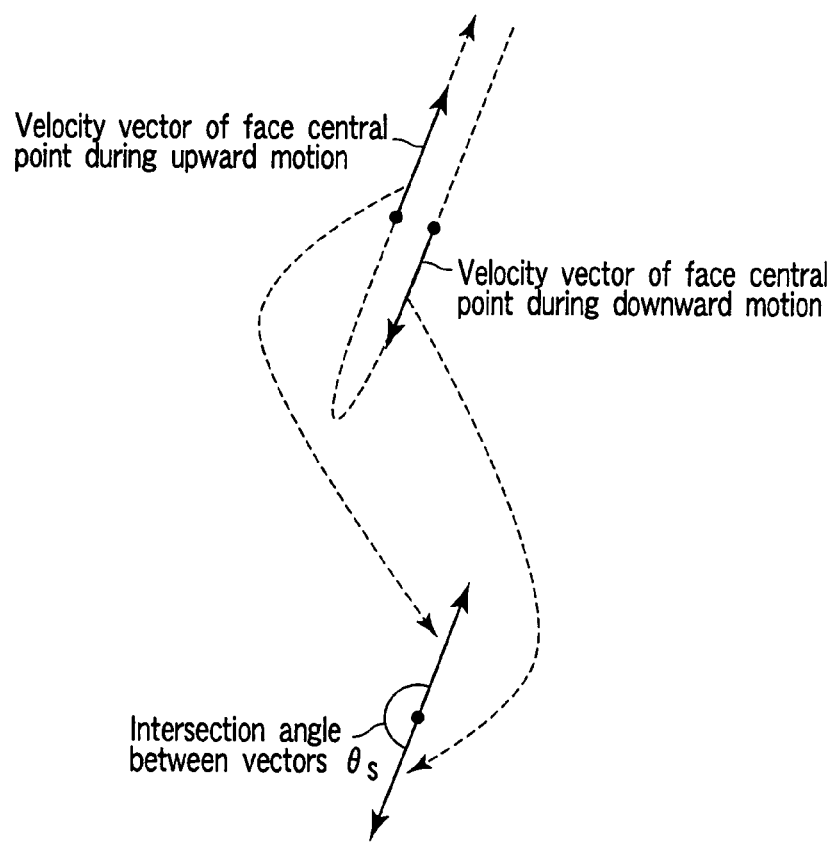
FIG. 9 is a diagram showing the intersection angle between the velocity vectors in the tilted nod motion.

Moreover, in the person's nod motion, the face central point does not exactly perform the vertical reciprocating motion as shown in FIG. 3. For example, as shown in FIG. 8, a reciprocating motion tilted slightly to the left or right may be performed in some case. However, when even the nod motion is a reciprocating motion, as shown in FIG. 9, a relative intersection angle θS of approximately 180 degrees is formed by the velocity vector at an arbitrary time during the downward motion, and that at the corresponding arbitrary time during the upward motion. Therefore, by the use of the above-described method, even the tilted reciprocating motion shown in FIG. 8 can be exactly detected as the nod motion.

It is to be noted that in the above-described method, since the relative intersection angle θS between the representative velocity vectors is compared with the threshold value ΘS to thereby detect the nod motion, matching with the standard pattern is not required for gesture detection. Therefore, the standard pattern does not have to be prepared beforehand, and there does not occur a problem of erroneous detection of the gesture by mismatch with the standard pattern. Therefore, it is possible to detect gesture with high precision. Furthermore, it is possible to reduce effects for the preparation of the standard pattern, and a calculation amount required for the matching can be reduced.

It is to be noted that here the example of the operation of the reciprocating motion detecting unit 109 has been described in accordance with the nod motion, but the head shake motion can be detected by a similar method. That is, in the head shake motion, the motion of the face central coordinate is a horizontal reciprocating motion as shown in FIG. 10. Therefore, the dynamic period is detected in the dynamic period detecting unit 106 during the leftward and rightward motions. Moreover, in the representative velocity vector calculating unit 107, the representative velocity vector is calculated from each dynamic period, and successively stored in the storage unit 108. These representative velocity vectors are directed in the right and left directions, respectively, and the relative intersection angle between both the vectors comes close to 180 degrees. Therefore, as described above, the intersection angle is calculated between the successively recorded representative velocity vectors among the representative velocity vectors stored in the storage unit 108. The angle is compared with the predetermined threshold value to thereby detect the reciprocating motion, and it is then possible to detect the head shake motion.

In the repetitive motion detecting unit 110, the representative velocity vectors stored in the storage unit 108 are successively read out, and it is detected from the representative velocity vector whether or not the face central point repeatedly performs its reciprocating motion.

A method will be described hereinafter in which it is detected from the representative velocity vector whether or not the face central point repeatedly performs its reciprocating motion. Here, an example will be described in which a person who is an object repeatedly performs the nod motion.

As described above, one nod motion of the object can be grasped as the vertical reciprocating motion of the face central point as shown in FIG. 3. Therefore, when the object repeats the nod motion, the motion of the face central point can be grasped as repetition of the vertical reciprocating motion as shown in FIG. 11.

Figure 12:
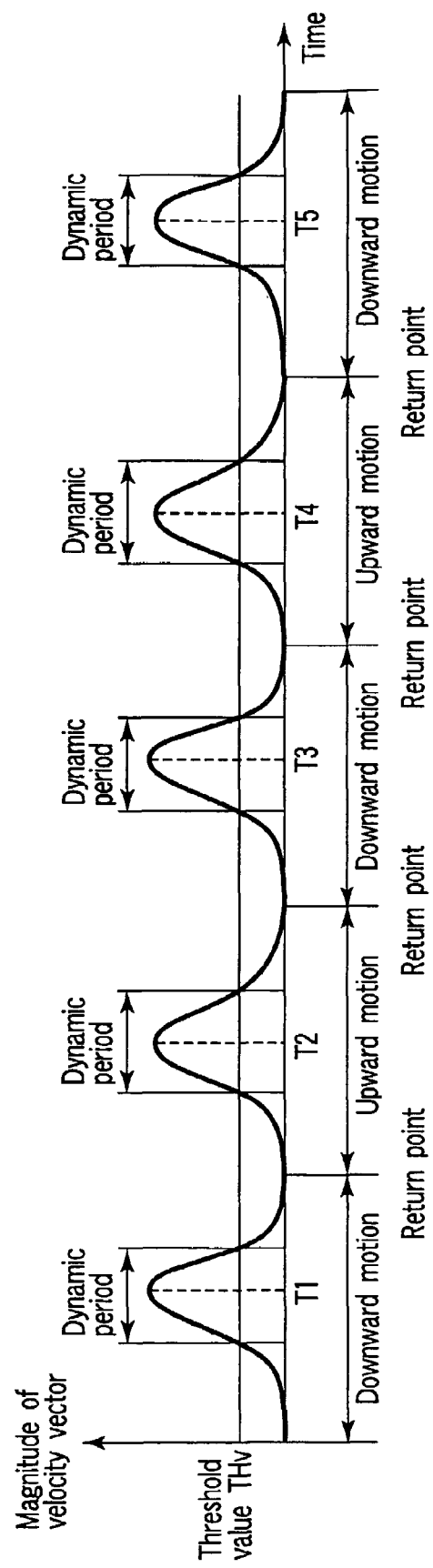
FIG. 12 is a diagram showing a change of the magnitude of the velocity vector of the face central point with time in a case where the nod motion is repeatedly performed.

When this vertical reciprocating motion is repeatedly performed, the magnitude of the velocity vector changes as shown in FIG. 12. Therefore, the dynamic period detected by the dynamic period detecting unit 106 is detected alternately during the downward motion and the upward motion as shown in FIG. 12. Furthermore, assuming that times when the magnitude of the velocity vector is maximized are (T1, T2, T3, . . . ) as shown in FIG. 12, the velocity vectors at these times are selected as representative velocity vectors for each dynamic period by the representative velocity vector calculating unit 107, and the selected representative velocity vectors are stored in order in the storage unit 108.

Figure 13:
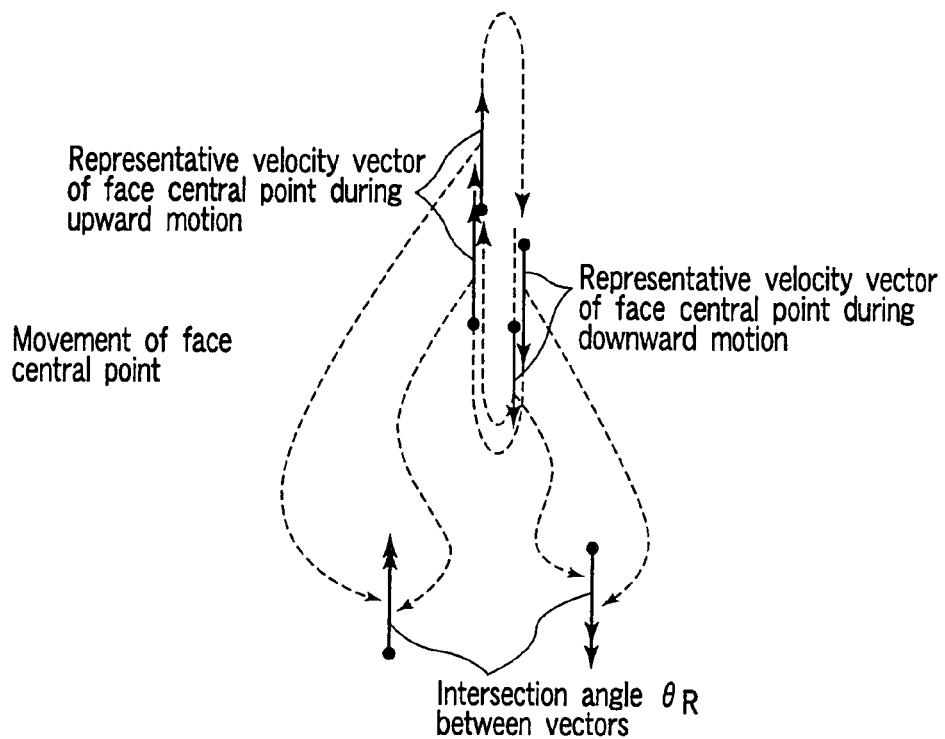
FIG. 13 is a diagram showing the intersection angle between representative velocity vectors in a case where the nod motion is repeatedly performed.

Here, since the velocity vectors at the times T1, T3, T5 . . . are velocity vectors appearing during the downward motion, all the directions are downward. Since the velocity vectors at the times T2, T4, . . . are velocity vectors appearing during the upward motion, all the directions are upward. Therefore, in this case, when the relative intersection angle θR of the velocity vector is obtained between the representative velocity vectors alternately stored in the storage unit 108, as shown in FIG. 13, the intersection angle θR comes close to 0 degrees.

Then, first in the reciprocating motion detecting unit 109, the representative velocity vectors successively stored in the storage unit 108 are read out, and a relative intersection angle θS is calculated which is formed between the representative velocity vectors. When the intersection angle θS is near 180 degrees, it is detected that the face central coordinate has performed the reciprocating motion. This detection result is sent to the repetitive motion detecting unit 110.

Next, in the repetitive motion detecting unit 110, a relative intersection angle θR between two representative velocity vectors every two representative velocity vectors is calculated. At this time, when the intersection angle θR is near zero, it is detected that the face central point has repeatedly performed the reciprocating motion. When this process is performed, it can be detected that the nod motion has been repeatedly performed. Specifically, the intersection angle θR between two representative velocity vectors every two representative velocity vectors is compared with the predetermined threshold value ΘR. When θR≦ΘR, it may be detected that the nod motion has been repeatedly performed. Here, the threshold value ΘR is a value of the intersection angle between the representative velocity vectors, and permits that the nod motion is repeatedly performed. This value is preferably set to 35 degrees or less in order to detect that the nod motion of the object repeats without any error.

Next, the nod/shake detecting unit 111 detects whether the reciprocating motion detected by the reciprocating motion detecting unit 109 is the nod motion or the head shake motion.

Figure 14:
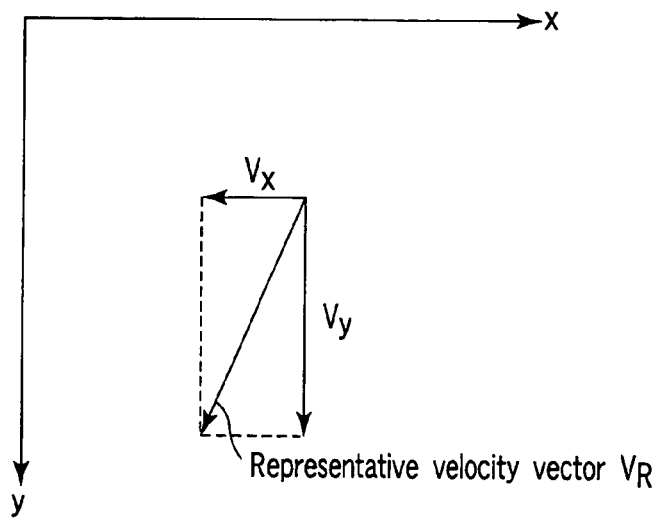
FIG. 14 is a diagram showing one example of the representative velocity vector.

As described above, the person's nod motion can be grasped as the vertical reciprocating motion of the face central point. The head shake motion can be grasped as the horizontal reciprocating motion of the face central point. Then, as shown in FIG. 14, in a case where the representative velocity vector stored in the storage unit 108 is represented by VR=(vx, vy), when |vx|≦|vy|, the face central point is largely displaced in the vertical direction, and the nod/shake detecting unit 111 detects that the reciprocating motion is the nod motion. Conversely, when |vx|>|vy|, the face central point is largely displaced in the horizontal direction, and therefore the reciprocating motion is detected as the shake motion. Here, |vx| and |vy| represent magnitudes of x and y-components of the representative velocity vector VR=(vx, vy).

Thus, the nod/shake detecting unit 111 compares the magnitude of the x-component with that of the y-component of the representative velocity vector VR=(vx, vy), and the unit can detect whether the reciprocating motion of the face central point is performed in the vertical or horizontal direction to thereby detect whether the motion is nod or shake.

It is to be noted that in the above-described example, the reciprocating motion of the face central point is classified into the nod motion or the shake motion to obtain a detection result. However, in an actual person's gesture, there is a case where the head reciprocating motion is intentionally performed in an oblique direction. In this case, the motion cannot be detected as the nod or the shake. For example, in a case where question and answer are performed between a user and a system, the user sometimes moves his head in an oblique direction with respect to the question from the system without nodding or shaking. In this case, the user does not express an intention to agree (nod) or disagree (shake) with the system's question, and expresses intentions such as doubt and hesitation in many cases. Therefore, in a case where the face central point performs the oblique reciprocating motion which cannot be detected as the nod motion or the shake motion, instead of detecting the reciprocating motion as the nod or the shake to output a result, the motion is not detected as the nod motion or the shake motion, and an output of the result is required to be reserved in some case.

Therefore, a method of reserving the output of the result will be described hereinafter in a case where the oblique reciprocating motion is performed. Here, to simplify the description, it is assumed that the output of the result is reserved in a case where the head reciprocating motion is performed in a range of region 1 shown by slanted lines of FIG. 15. On the other hand, either detection result is output that indicates the nod motion or the shake motion in a case where the head reciprocating motion is performed in a range of region 2 shown in blank.

Figure 15:
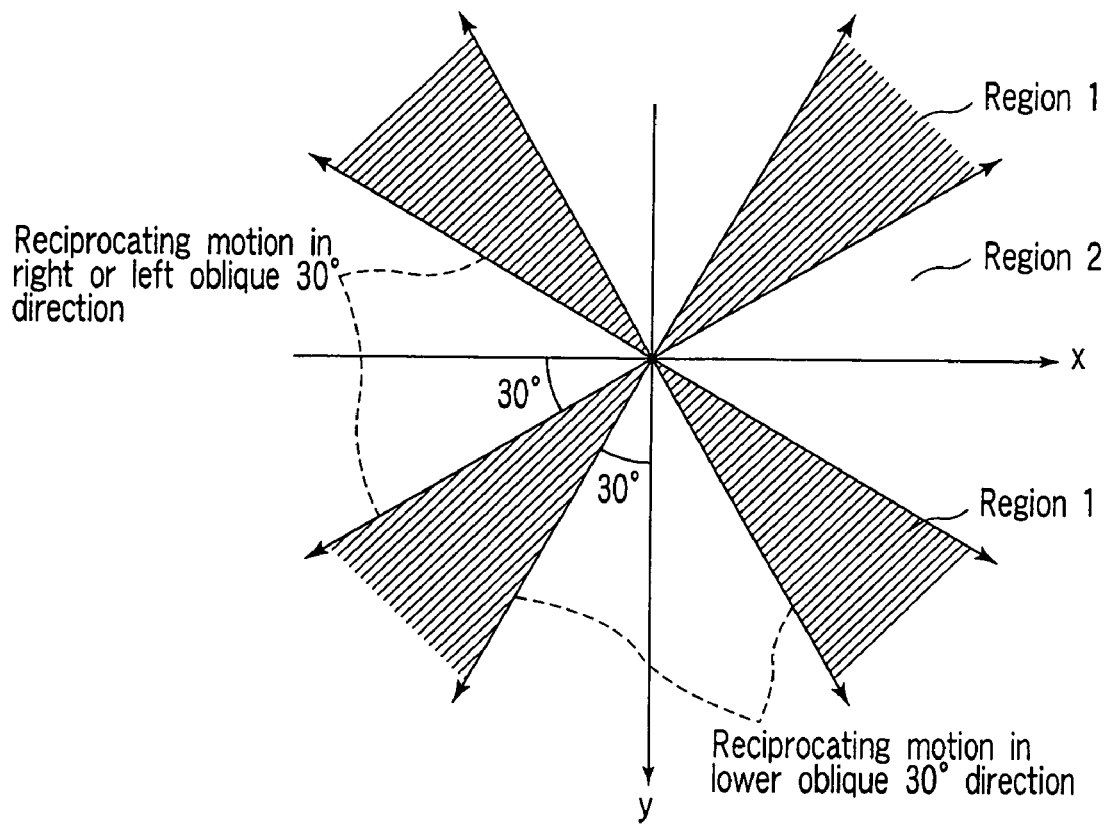
FIG. 15 is an explanatory view of a motion example of a nod and shake detecting unit.

Here, in the reciprocating motion in a boundary between the regions 1 and 2 in a lower oblique 30 degrees direction of FIG. 15, a ratio of a magnitude vx of the x-component to a magnitude vy of the y-component is |vx|:|vy|=1:√3 in the representative velocity vector VR=(vx, vy). In the reciprocating motion in the boundary between the regions 1 and 2 in a left or right oblique 30 degree direction, the ratio of the magnitude vx of the x-component to the magnitude vy of the y-component is |vx|:|vy|=√3:1 in the representative velocity vector VR=(vx, vy). Here, r is defined from |vx| and |vy| by equation (10).

$$r = \frac{\max(|v_x|, |v_y|)}{\min(|v_x|, |v_y|)} \tag{10}$$

At this time, r≦√3 results in the reciprocating motion in the region 1 shown in FIG. 15. On the other hand, r>√3 results in the reciprocating motion in the region 2 shown in FIG. 15. Then, when R=√3 is determined, the nod/shake detecting unit 111 outputs either the nod motion or the shake motion as the detection result in a case where r>R. The unit reserves the output of the detection result in a case where r≦R. In this case, the detection result indicating the nod or shake motion only in a case where the reciprocating motion is performed in the range of the region 2 shown in FIG. 15, and the output of the detection result can be reserved in a case where the reciprocating motion is performed in the range of the region 1.

By this method, when the reciprocating motion of the face central point cannot be distinguished as the nod or shake motion, and is an oblique reciprocating motion, the output of the result can be reserved, and a person who is an object and who has performed the gesture can prevent an unintended detection result from being output.

Moreover, the nod/shake detecting unit 111 may detect the nod motion or the head shake motion using the result in the repetitive motion detecting unit 110. That is, in a case where the person who is the object performs the nod motion or the head shake motion, the reciprocating motion is performed a plurality of times in many cases. Therefore, as to the head shake motion, it is detected that the head shake motion has been performed only in a case where the reciprocating motion of head shaking is repetitively performed. Thus, the object nod motion and the head shake motion can be detected with a higher precision.

In this case, first the nod/shake detecting unit 111 compares the magnitude of the x-component with that of the y-component of the representative velocity vector VR=(vx, vy), and detects that the reciprocating motion is the nod motion or the shake motion. At this time, when it is detected that the reciprocating motion is the shake motion, the detection result of the repetitive motion detecting unit 110 is referred to. That is, when it is detected that the reciprocating motion is repetitively performed in the repetitive motion detecting unit 110, the nod/shake detecting unit 111 detects that the user has performed the head shake motion. Conversely, when it is detected that the reciprocating motion is completed only once, and is not repetitively performed, it is detected that the user does not perform the head shake motion.

Thus, the nod/shake detecting unit 111 can detect the nod motion and the shake motion of the person who is the object by using the result of the repetitive motion detecting unit 110 with a higher precision.

Figure 16:
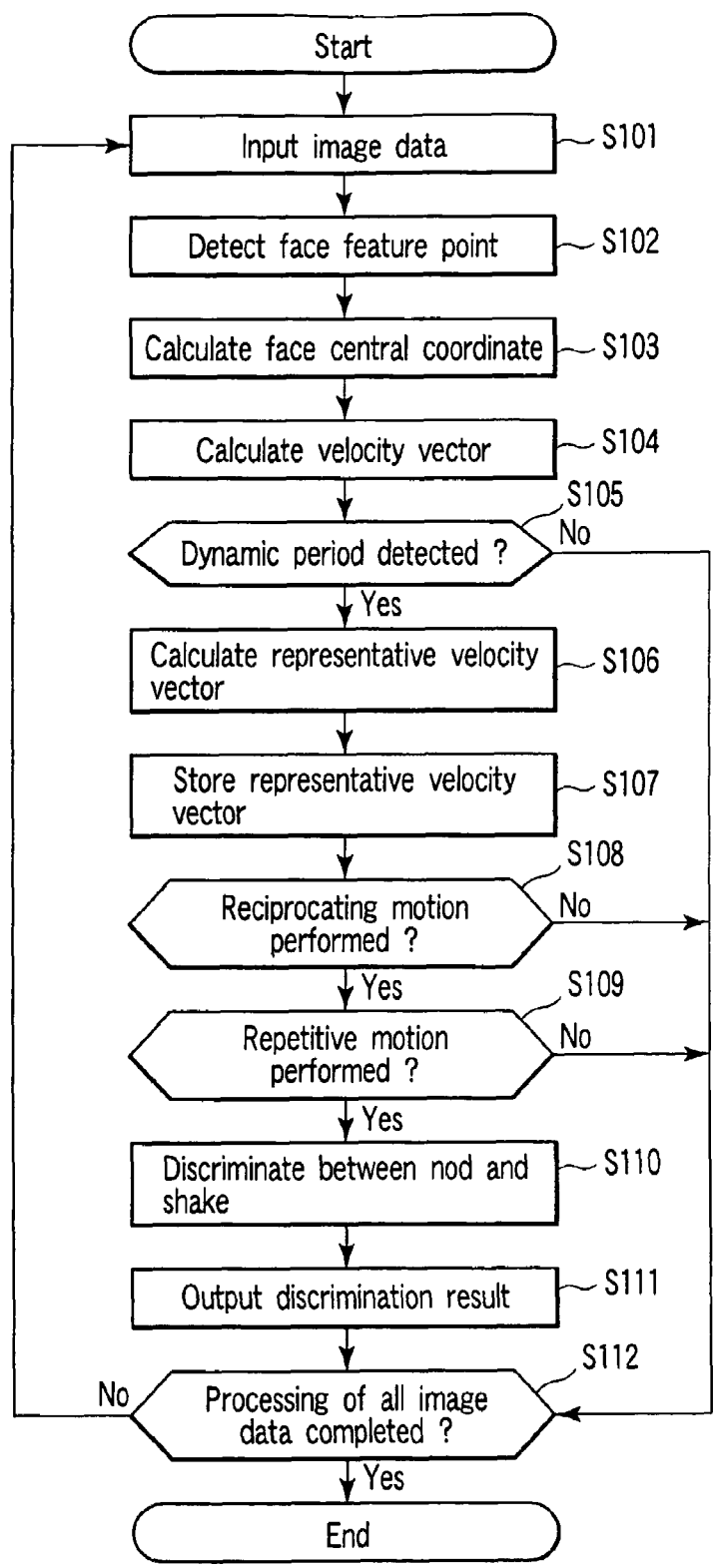
FIG. 16 is a flowchart showing an operation of a process of a gesture detecting system.

Next, an operation of processing of the gesture detecting system 101 will be described according to the present embodiment using a flowchart shown in FIG. 16.

In step S101, image data is input from the outside into the image input unit 102 of the gesture detecting system 101. The input image data is sent to the face feature point detecting unit 103, and the operation advances to step S102.

In step S102, the face feature point is detected in the face feature point detecting unit 103. The detected face feature point is sent to the face central coordinate calculating unit 104, and the process advances to step S103.

In step S103, in the face central coordinate calculating unit 104, the coordinate of the face central point is calculated from the coordinate of the face feature point detected by the face feature point detecting unit 103, and the process advances to the step S104.

In step S104, in the velocity vector calculating unit 105, the velocity vector of the face central point is calculated for each frame from the face central coordinate obtained by the face central coordinate calculating unit 104, and the process advances to step S105.

In step S105, in the dynamic period detecting unit 106, the dynamic period is detected from the velocity vector of the face central coordinate for each frame obtained in the velocity vector calculating unit 105. When the dynamic period is detected in the dynamic period detecting unit 106, the process advances to step S106. When the dynamic period is not detected, the process advances to step S112.

In step S106, in the representative velocity vector calculating unit 107, the representative velocity vector is calculated from the velocity vectors included in the dynamic period detected in the dynamic period detecting unit 106, and the representative velocity vector calculated in the representative velocity vector calculating unit 107 is stored in the storage unit 108 in step S107.

Next, in step S108, it is detected in the reciprocating motion detecting unit 109 whether or not the face central point performs the reciprocating motion. In the reciprocating motion detecting unit 109, the relative intersection angle θS is calculated between a latest representative velocity vector stored in the storage unit 108, and a representative velocity vector which has previously appeared. This angle is compared with the predetermined threshold value ΘS to detect the reciprocating motion. When it is detected in the reciprocating motion detecting unit 109 that the reciprocating motion exists, the process advances to step S109. When it is detected that the reciprocating motion does not exist, the process advances to step S112.

In step S109, it is detected in the repetitive motion detecting unit 110 whether or not the face central point repetitively performs the reciprocating motion. In the repetitive motion detecting unit 110, the relative intersection angle θR is calculated between two representative velocity vectors every two representative velocity vectors stored in the storage unit 108, one of which is the latest representative velocity vector stored in the storage unit 108 and the other of which is the representative velocity vector that has stored before the latest vector. This angle is compared with the predetermined threshold value ΘR to detect the repetitive motion. When it is detected in the repetitive motion detecting unit 110 that the reciprocating motion is repetitively performed, the process advances to step S110. When it is detected that the reciprocating motion is not repetitively performed, the process advances to step S112.

In step S110, it is detected in the nod/shake detecting unit 111 whether the head reciprocating motion of the person who is the object detected by the reciprocating motion detecting unit 109 is the nod motion or the head shake motion. To distinguish the nod from the shake, the magnitude of the vertical velocity component of the latest representative velocity vector of the face central point stored in the storage unit 108 is compared with the magnitude of the horizontal velocity component. When the magnitude of the vertical velocity component is not less than that of the horizontal velocity component, the nod motion is detected. If not, the head shake motion is detected.

Next, the process advances to step S111 to output the detection result obtained by the nod/shake detecting unit 111 with respect to the user.

In last step S112, it is detected whether or not all image data has been processed. When the processing of all the data is completed, the processing is ended. If the processing is not completed, the process returns to step S101.

As described above, according to the gesture detecting system of the first embodiment, it is detected whether or not the face central point performs the reciprocating motion or the repetitive motion based on the relative intersection angle formed by two representative velocity vectors of the face central coordinate. Accordingly, it is possible to robustly detect the gesture including the nod motion or the head shake motion and the repetitive motion of the person which is the object with speed and precision.

It is to be noted that in the gesture detecting system according to the first embodiment, the representative velocity vector calculated by the representative velocity vector calculating unit 107 is the velocity vector whose magnitude is maximum among the velocity vectors included in the dynamic period detected by the dynamic period detecting unit 106, but the representative velocity vector may be an average vector of the velocity vectors included in the dynamic period.

That is, in the nod motion of the person who is the object, as shown in FIG. 5, the dynamic period is detected in the dynamic period detecting unit 106 during the head downward and upward motions. Therefore, the velocity vector included in each period is all directed downwards or upwards in each period. Therefore, when the average vector of the velocity vectors included in each dynamic period is calculated, the average vector is also directed downwards or upwards in each period. Therefore, assuming that the average vector calculated in this manner is the representative velocity vector, the relative intersection angle is obtained between the vectors. Then, in the same manner as in the first embodiment, it is possible to robustly detect the nod motion or the head shake motion and the repetitive motion of the person who is the object with speed and precision. Moreover, when the average vector of the velocity vectors is obtained as the representative velocity vector in this manner, the influence of the noise is smoothed even in a case where the noise is superimposed upon the time series data of the velocity vector. It is possible to detect the gesture with a higher precision.

Furthermore, the representative velocity vector calculated by the representative velocity vector calculating unit 107 may be a velocity vector at a central time of the dynamic period detected by the dynamic period detecting unit 106. That is, when the nod motion is smoothly performed, it is supposed that the magnitude of the velocity vector is maximum at a time in the vicinity of the center of the dynamic period. Therefore, assuming that the velocity vector at the center time of the dynamic period is the representative velocity vector, it is possible to robustly detect the nod motion or the head shake motion and the repetitive motion of the person who is the object with speed and precision.

Moreover, in the gesture detecting system according to the first embodiment, the coordinate of the face central point is represented by a two-dimensional coordinate, but the coordinate of the face central point is represented by a three-dimensional coordinate, and it is possible to detect the nod motion or the head shake motion of the object from the time series data of the three-dimensional coordinate. That is, when the image data of the object's head is captured using a plurality of cameras, and the three-dimensional coordinate of the face central point is obtained from the image data based on a stereo vision principle, the two-dimensional coordinate of the above-described method may be replaced with the three-dimensional coordinate to thereby detect the nod motion or the head shake motion of the person who is the object.

Furthermore, in the gesture detecting system according to the first embodiment, the nod motion and the head shake motion of the person who is the object are detected, but the system may be applied to any reciprocating motion without being limited to the nod motion or the shake motion. That is, by the use of the above-described method, it is possible to detect even gestures to vertically reciprocate a hand or to entirely physically bend and stretch. Furthermore, even in a case where a certain object is held in the hand and vertically moved, it is possible to detect the movement of the object by the use of the above-described method.

Second Embodiment

In the first embodiment, the nod motion or the head shake motion of the person who is the object is grasped as the reciprocating motion of the face central point on the two-dimensional plane, and the movement of the face central point is represented by the time series data of a two-dimensional coordinate (x, y).

However, the nod motion or the head shake motion may be grasped as the head vertical and horizontal rotation. Therefore, in the second embodiment, a method will be described in which a nod motion or a head shake motion of a person who is an object is grasped as a motion to rotate a head pose in vertical and horizontal directions, the head pose is represented by time series data of a two-dimensional coordinate ($\psi$, $\phi$) of a vertical rotation angle $\psi$ and a horizontal rotation angle $\phi$, and the nod motion and the head shake motion of the person who is the object are detected from the time series data of the coordinate.

Figure 17:
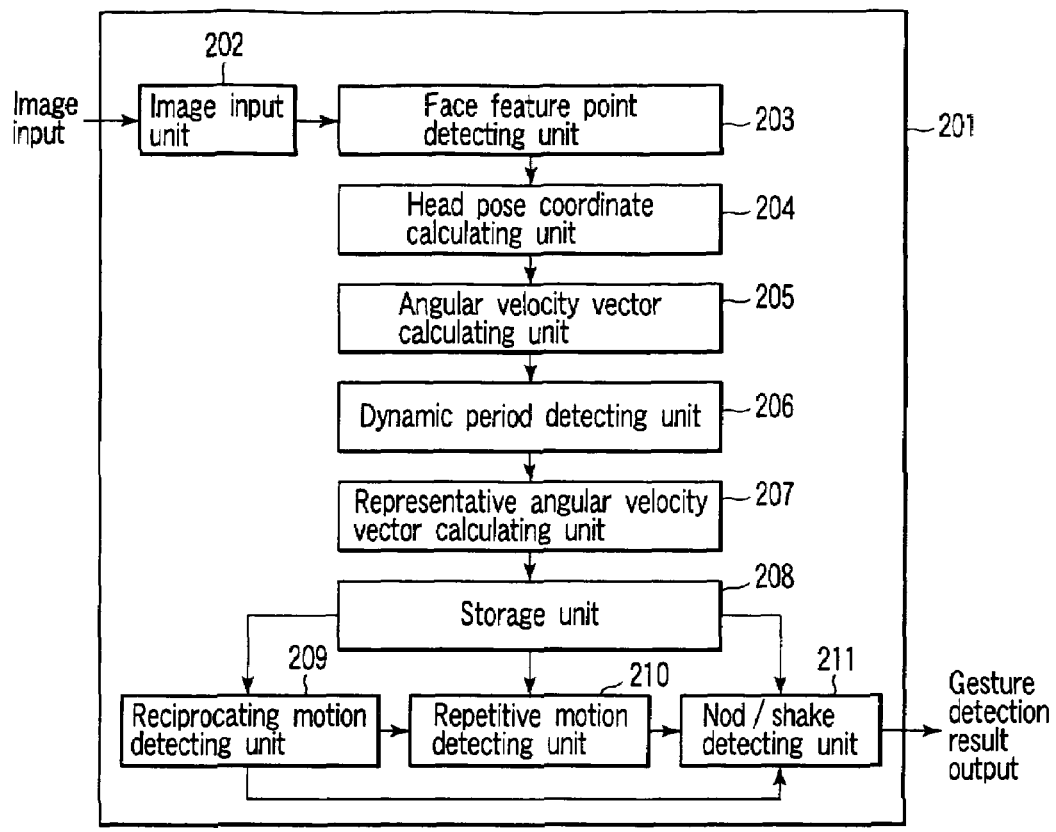
FIG. 17 is a block diagram showing an example of the functional arrangement of the gesture detecting system according to a second embodiment.

FIG. 17 shows an example of the functional arrangement of a gesture detecting system for realizing a gesture detecting system according to the second embodiment of the present invention.

A gesture detecting system 201 according to the second embodiment comprises: an image input unit 202; a face feature point detecting unit 203; a head pose coordinate calculating unit 204; an angular velocity vector calculating unit 205; a dynamic period detecting unit 206; a representative angular velocity vector calculating unit 207; a storage unit 208; a reciprocating motion detecting unit 209; a repetitive motion detecting unit 210; and a nod/shake detecting unit 211. Some or all of these constituting elements may be constituted by hardware or software.

Next, a constitution and an operation of the gesture detecting system 201 will be described according to the second embodiment.

The image input unit 202 receives an image of a user captured by a video camera or the like from the outside of the system, converts the image into digital electronic data in such a manner that the image is easily processed to prepare face image data, and sends time series data to the face feature point detecting unit 203. It is to be noted that the face image data at each time will be hereinafter referred to as a frame.

The face feature point detecting unit 203 detects a face feature point for each frame from the time-series face image data sent from the image input unit 202. As a method of detecting the face feature point, a method is usable which is described in Jpn. Pat. No. 3279913.

Figure 18:
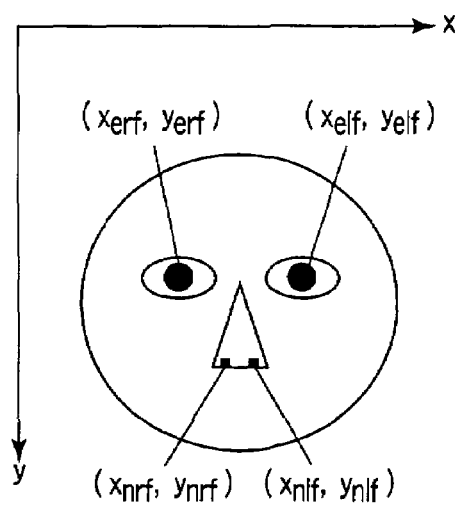
FIG. 18 is a diagram showing a two-dimensional coordinate of a face feature point.

It is to be noted that face feature points will be described in accordance with right/left eyes and nostrils. When the right/left eyes and nostrils are detected as the face feature points, as shown in FIG. 18, a coordinate (xelf, yelf) of the left eye, a coordinate (xerf, yerf) of the right eye, a coordinate (xnlf, ynlf) of the left nostril, and a coordinate (xnrf, ynrf) of the right nostril are obtained for each frame. It is to be noted that f is a parameter indicating a frame number.

Next, the face feature points of the coordinates of the right/left eyes and nostrils detected by the face feature point detecting unit 203 are sent to the head pose coordinate calculating unit 204.

The head pose coordinate calculating unit 204 calculates a head pose coordinate from the right/left eye and nostril coordinates sent from the face feature point detecting unit 203.

Figure 19:
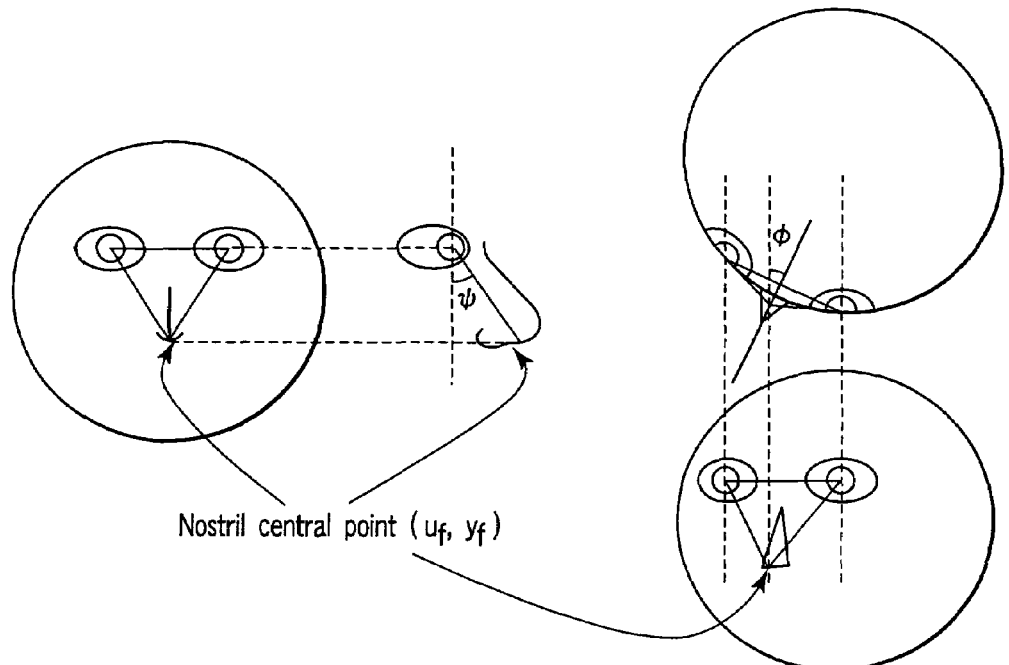
FIG. 19 is a diagram showing a head pose coordinate (ψ, φ)

Here, head pose coordinates ($\psi$, $\phi$) are calculated by the head pose coordinate calculating unit 204, and are defined as an inclination angle $\psi$ with respect to a vertical direction of an isosceles triangle determined by three points of the right/left eyes and the nostril central point, and a deflection angle $\phi$ of the nostril central point from the front face as shown in FIG. 19.

Figure 20:
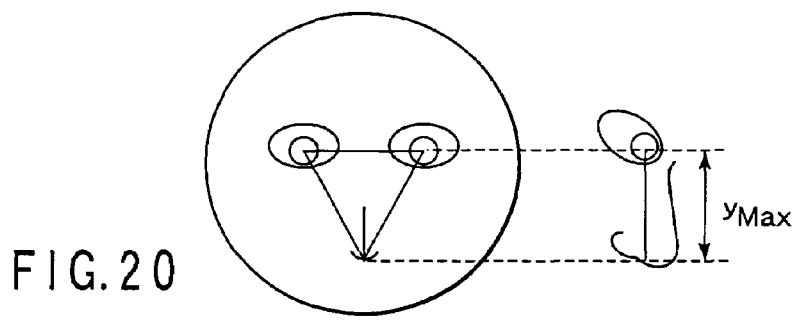
FIG. 20 is an explanatory view of yMax.

In the head pose coordinate calculating unit 204, to calculate the head pose coordinate ($\psi f$, $\phi f$) of each frame, first coordinate conversion is performed for each frame in such a manner that the left eye coordinate (xelf, yelf) and the right eye coordinate (xerf, yerf) are (−1, 0) and (1, 0), respectively, and a central coordinate (uf, yf) of the right/left nostrils is obtained on the converted coordinate. Next, the head pose coordinate calculating unit 204 calculates the head pose coordinate ($\psi f$, $\phi f$) using this nostril central coordinate (uf, yf). Here, $\psi f$ and $\phi f$ which are head pose coordinates of each frame can be approximately calculated by the nostril central coordinate (uf, yf) as in equation (11).

$$\psi_f = \arcsin\sqrt{\frac{y^2\text{Max} - y_f^2 - u_f^2 + \sqrt{(y_f^2 - y_{Max}^2 + u_f^2)^2 + 4u_f^2}}{2y^2\text{Max}}} \quad (11)$$

$$\phi_f = -\arctan\left(\frac{u_f}{y_{Max}\sin\psi_f}\right)$$

where yMax denotes the maximum value of the distance from the midpoint of the right/left eyes to the nostril center on the converted coordinate as shown in FIG. 20. A value of yMax may be experimentally obtained beforehand.

The angular velocity vector calculating unit 205 calculates an angular velocity vector of rotation of the head pose for each frame from the head pose coordinate ($\psi f$, $\phi f$) calculated by the head pose coordinate calculating unit 204. The angular velocity vector (hereinafter referred to as the angular velocity vector of the head pose) Vf=(v$\psi$f, v$\phi$f) of the rotation of the head pose can be obtained as displacement of the head pose coordinate between the frames by equation (12).

$$v\psi f = \frac{\psi f + 1 - \psi f}{\Delta t} \quad (12)$$

$$v\phi f = \frac{\phi f + 1 - \phi f}{\Delta t}$$

where $\Delta t$ denotes the time interval between the time when an f-th frame of an image input into the image input unit 202 is captured and a time when an f+1-th frame is captured. The angular velocity vector Vf=(v$\psi$f, v$\phi$f) is calculated by the angular velocity vector calculating unit 205, and sent to the dynamic period detecting unit 206.

The dynamic period detecting unit 206 detects a time period (dynamic period) in which a motion to rotate the face is performed using the angular velocity vector Vf of the head pose sent from the angular velocity vector calculating unit 205. Here, the dynamic period refers to a time period in which all the magnitudes of the angular velocity vectors included in this period are larger than a predetermined threshold value. That is, the period indicates successive periods constituted by a frame which satisfies a condition represented by equation (13) in a case where time series data of the angular velocity vector is represented by {V1, V2, . . . , Vf, . . . }.

$$\|V_f\| > TH_V \quad (13)$$

where THv is a predetermined threshold value of the magnitude of the angular velocity vector. Moreover, $\|Vf\|$ indicates a magnitude of the angular velocity vector Vf=(v$\psi$f, v$\phi$f) in the f-th frame.

The dynamic period detected by the dynamic period detecting unit 206 in this manner is sent to the representative angular velocity vector calculating unit 207.

The representative angular velocity vector calculating unit 207 calculates a representative angular velocity vector VR from the angular velocity vectors included in the dynamic period with respect to each dynamic period detected by the dynamic period detecting unit 206. Here, the representative angular velocity vector VR is an angular velocity vector whose magnitude is maximum in each dynamic period among the angular velocity vectors included in the dynamic period.

In this case, one dynamic period detected by the dynamic period detecting unit 206 is a period from an fs-th frame to an fe-th frame. Furthermore, assuming that the time series data of the angular velocity vectors included in the period is {Vfs, Vfs+1, . . . , Vfe}, and the representative angular velocity vector is VR, the representative angular velocity vector VR is a velocity vector which satisfies equation (14).

$$\|V_R\| > \|V_i\| (i=f_s, \ldots, f_e, i \neq R) \quad (14)$$

Thus, the representative angular velocity vector calculating unit 207 calculates the representative angular velocity vector VR every time the dynamic period is detected by the dynamic period detecting unit 206. Moreover, the calculated representative angular velocity vector VR is stored as the time series data in the storage unit 208.

The reciprocating motion detecting unit 209 detects from the representative angular velocity vector stored in the storage unit 208 whether or not the head pose performs a reciprocating motion by rotation.

Next, a method will be described in which the reciprocating motion of the head pose is detected from the representative angular velocity vectors stored in the storage unit 208. Here, an example will be described in accordance with the nod motion of the head.

Figure 21:
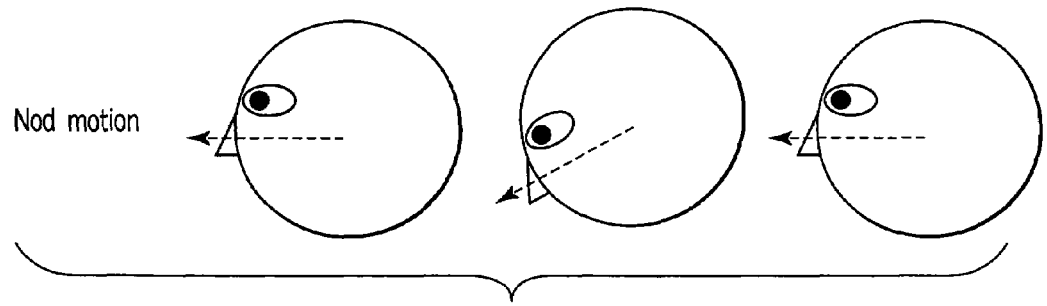
FIG. 21 is a diagram showing a change of a head pose in the nod motion.

As described above, the nod motion comprises a motion for shaking the head downwards, and an accordingly continuously performed motion for returning the head upwards. That is, when a head pose angle is noted, the nod motion can be grasped as the vertical reciprocating motion of the head pose by the rotation as shown in FIG. 21.

Figure 22:
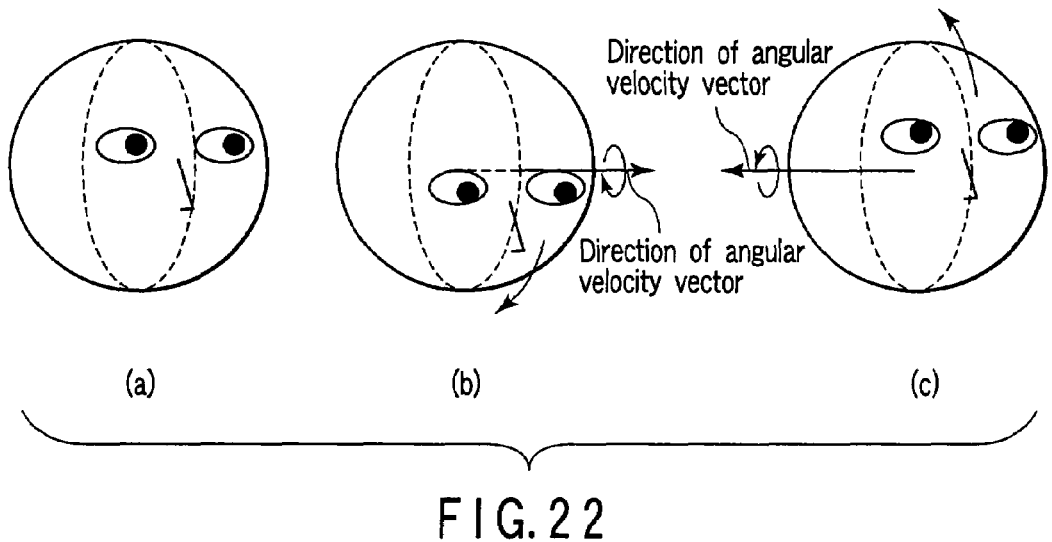
FIG. 22 is a diagram showing an angular velocity vector of the head pose in the nod motion.

Here, in the vertical reciprocating motion of the head pose by the rotation, a direction of the angular velocity vector of the head pose at an arbitrary time during the downward rotation motion is a vertical direction with respect to a rotation plane, and is a forward direction of a right screw in a case where the right screw rotates in the rotation direction. This is shown in FIG. 22(*b*). On the other hand, the direction of the angular velocity vector of the head pose coordinate can be similarly considered at the arbitrary time during the upward rotation motion, and this is shown in FIG. 22(*c*).

Here, the direction of the angular velocity vector of the head pose during the downward rotation motion is substantially reverse to that of the angular velocity vector of the head pose during the upward rotation motion. Therefore, when a relative angle (intersection angle) $\theta S$ formed by both the angular velocity vectors is obtained, the intersection angle $\theta S$ comes close to 180 degrees.

Figure 23:
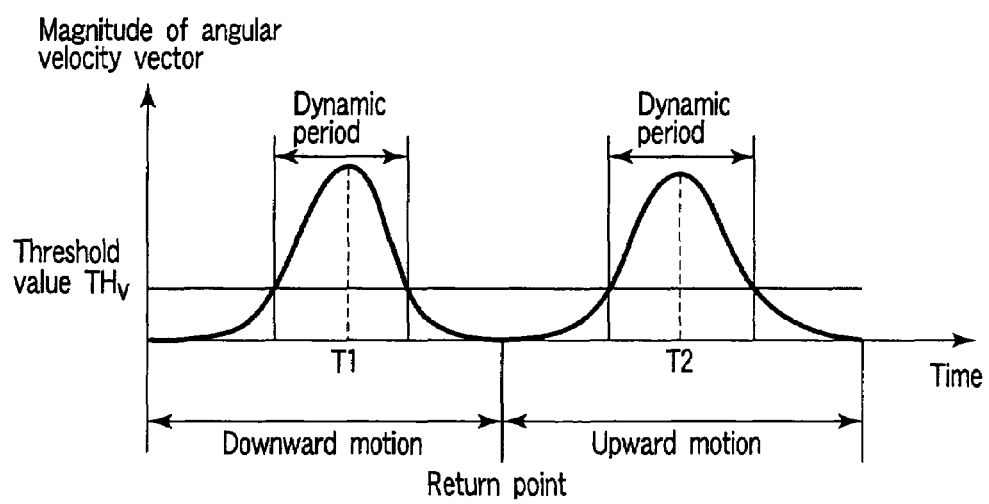
FIG. 23 is a diagram showing a change of a magnitude of an angular velocity vector of the head pose with time in the nod motion.

Next, a change will be described in the magnitude of the angular velocity vector of the head pose in the reciprocating motion. FIG. 23 is a diagram showing a change of a magnitude of the angular velocity vector with time. Before reciprocating motion start, the head pose has a static state, and the magnitude of the angular velocity vector of the head pose is zero. Moreover, when the head pose starts its rotation downwards, the magnitude of the angular velocity vector increases, and reaches a return point via a time T1 when the magnitude of the angular velocity vector is maximized. At the return point, the head pose shifts from the downward rotation motion to the upward rotation motion. Therefore, the magnitude of the angular velocity vector momentarily indicates zero. Next, when the head pose starts its rotation upwards, the magnitude of the angular velocity vector increases again, and the head pose returns to its original position to stand still via a time T2 when the magnitude of the angular velocity vector is maximized.

Here, when the threshold value THv of the equation (13) is set to an appropriate value, as shown in FIG. 23, the dynamic period detecting unit 206 detects two dynamic periods in one nod motion. As described above, the representative angular velocity vector calculated by the representative angular velocity vector calculating unit 207 is assumed as the angular velocity vector whose magnitude is maximum among the velocity vectors included in the dynamic period detected by the dynamic period detecting unit 206. Then, the velocity vectors at times T1 and T2 are selected as the representative angular velocity vectors in FIG. 23. Therefore, the angular velocity vectors at these times are continuously stored as the representative velocity vectors in the storage unit 208.

Moreover, as described above, since the direction of the angular velocity vector during the downward rotation motion is substantially reverse to that of the angular velocity vector during the upward rotation motion, an intersection angle θS formed by both the angular velocity vectors is calculated near 180 degrees.

Then, the reciprocating motion detecting unit 209 reads out two successive representative angular velocity vectors stored in the storage unit 208, and calculates an intersection angle θS between two representative angular velocity vector. Moreover, when the intersection angle θS is near 180 degrees, it is detected that the head pose coordinate has performed the reciprocating motion, that is, the nod motion has been performed. Specifically, the intersection angle θS between the representative angular velocity vectors is compared with a predetermined threshold value ΘS, and it may be detected that the nod motion has been performed in a case where θS≧ΘS.

Figure 24:
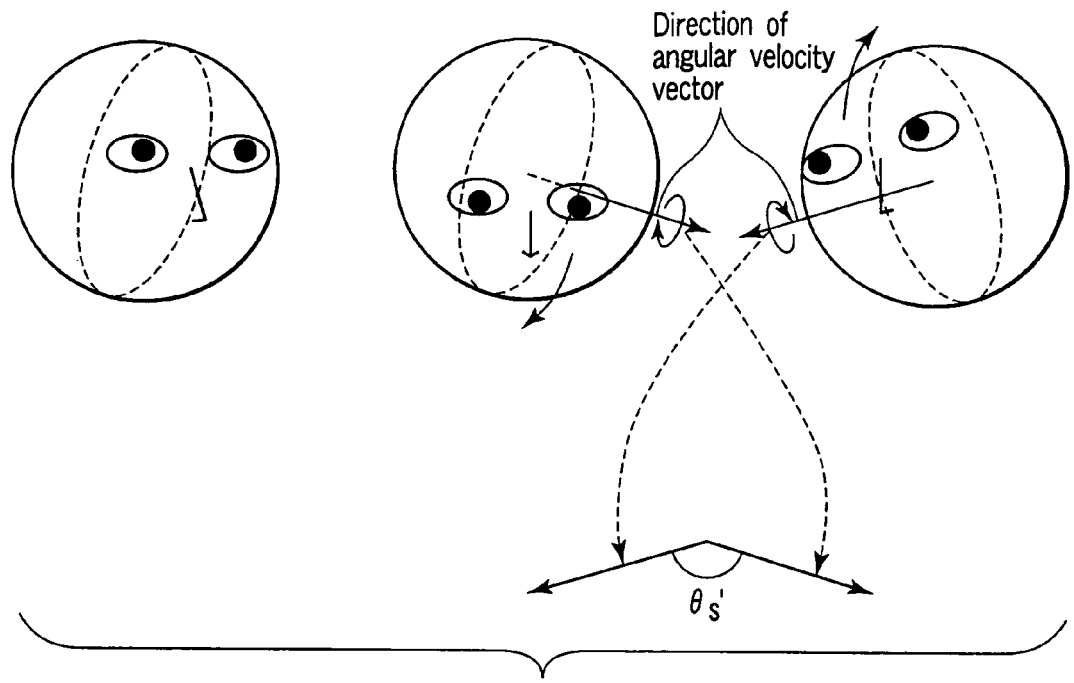
FIG. 24 is a diagram showing the angular velocity vector of the head pose of a motion which cannot be said to be the nod motion.

Next, when the head pose performs a rotation motion to track a V-shape, and this cannot be said to be a reciprocating motion as shown in FIG. 24, an intersection angle θS' between the representative velocity vectors successively stored in the storage unit 208 is largely below 180 degrees as shown in FIG. 24. Therefore, a comparison result with the threshold value ΘS is θS'<ΘS, and it can be detected that the motion is not a nod motion.

Figure 25:
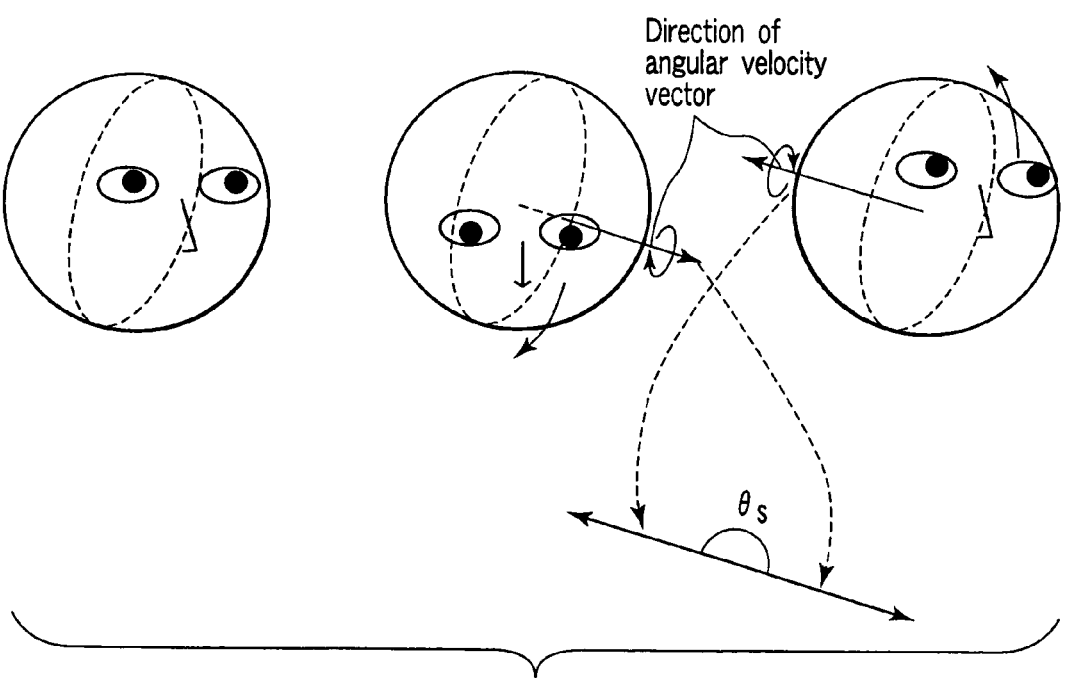
FIG. 25 is a diagram showing the angular velocity vector of the head pose in a tilted nod motion.

Moreover, in the object's nod motion, as shown in FIG. 25, a reciprocating motion tilted slightly to the left or right may be performed in some case. However, when even the nod motion is a reciprocating motion, as shown in FIG. 25, a relative intersection angle θS of approximately 180 degrees is formed by the angular velocity vector at an arbitrary time during the downward rotation motion, and that at the arbitrary time during the upward rotation motion. Therefore, by the use of the above-described method, even the tilted reciprocating motion can be exactly detected as the nod motion.

Figure 26:
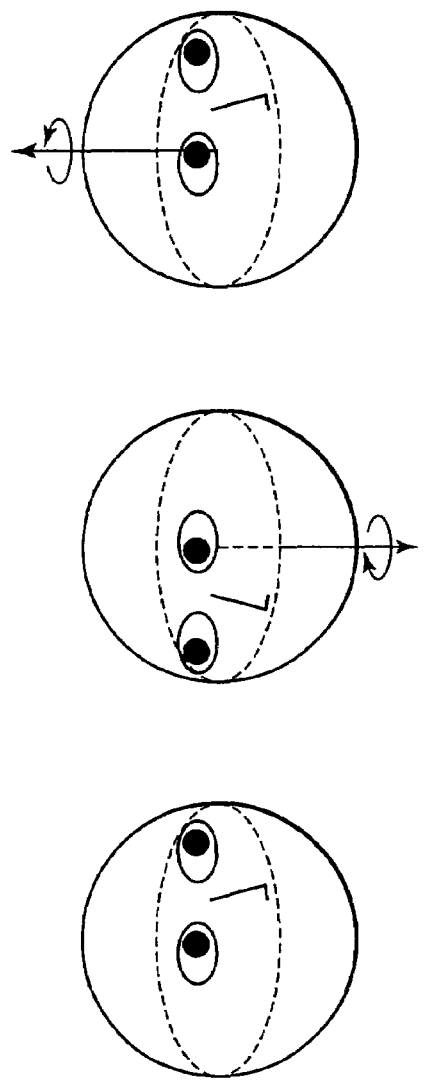
FIG. 26 is a diagram showing the angular velocity vector of the head pose in a head shake motion.

It is to be noted that here the example of the operation of the reciprocating motion detecting unit 209 has been described in accordance with the nod motion, but the head shake motion can be detected by a similar method. That is, in the head shake motion, the movement of the head pose is a horizontal rotation motion of the head pose as shown in FIG. 26. Therefore, the dynamic period is detected in the dynamic period detecting unit 206 during the leftward and rightward rotation motions. Moreover, in the representative angular velocity vector calculating unit 207, the representative angular velocity vector is calculated from each dynamic period, and successively stored in the storage unit 208. These representative angular velocity vectors are directed in the vertical directions, respectively, with respect to a rotation plane, and the relative intersection angle θS between both the vectors comes close to 180 degrees. Therefore, as described above, the intersection angle θS is calculated between the successively appearing representative angular velocity vectors among the representative angular velocity vectors stored in the storage unit 208. The angle is compared with the predetermined threshold value ΘS to thereby detect the presence of the reciprocating motion, and it is then possible to detect the head shake motion.

Next, the repetitive motion detecting unit 210 detects from the representative angular velocity vector stored in the storage unit 208 whether or not the head pose coordinate repetitively performs the reciprocating motion.

A method will be described hereinafter in which it is detected from the representative angular velocity vector whether or not the head pose repetitively performs its reciprocating motion. Here, an example will be described in which a person who is an object repeatedly performs the nod motion.

Figure 27:
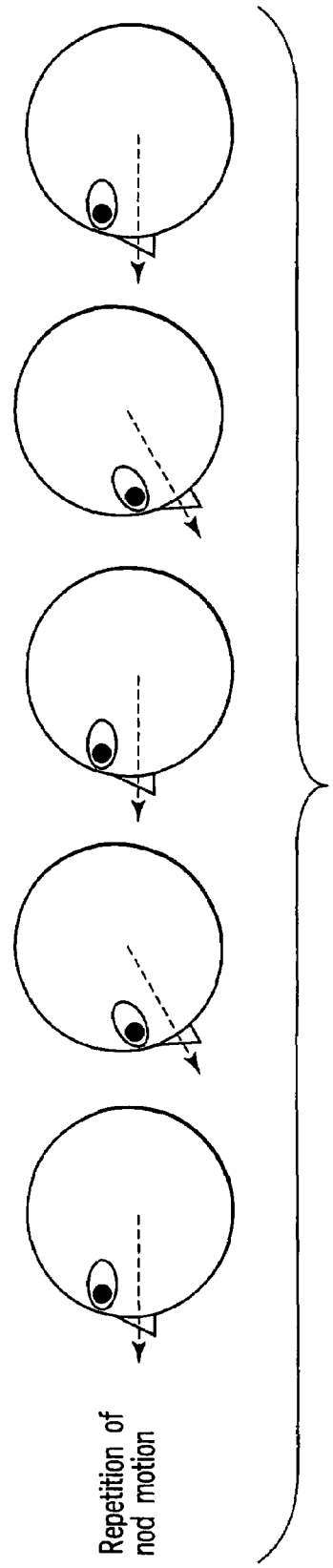
FIG. 27 is a diagram showing the change of the head pose in a case where the nod motion is repeatedly performed.

One nod motion of the person who is the object can be grasped as the reciprocating motion by the vertical rotation of the head pose shown in FIG. 21. Therefore, when the person who is the object repeats the nod motion, the motion of the head pose can be grasped as repetition of the vertical reciprocating motion as shown in FIG. 27.

Figure 28:
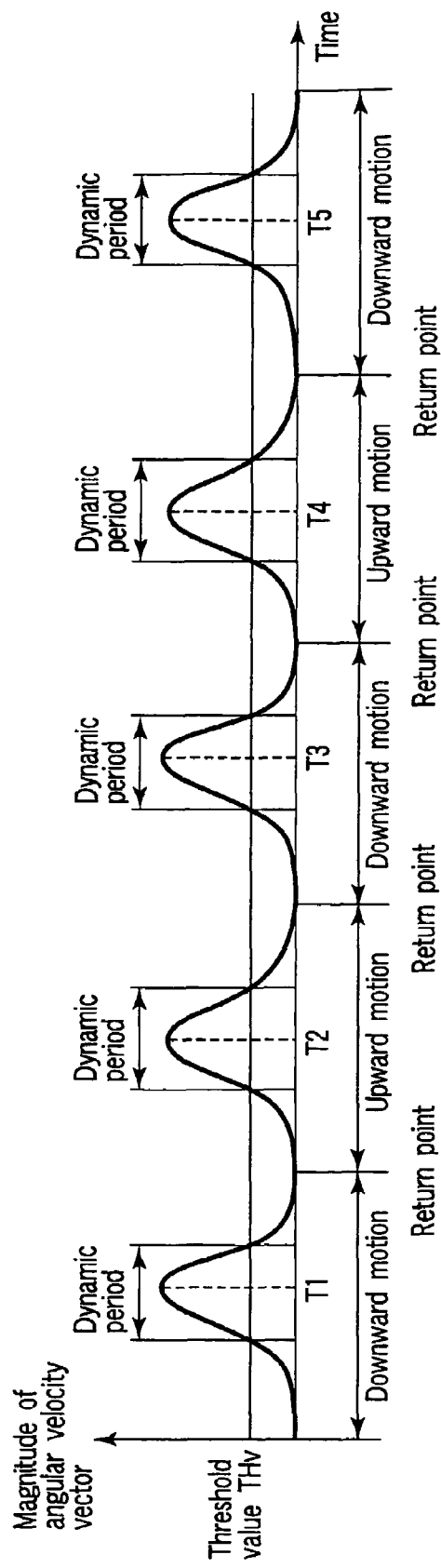
FIG. 28 is a diagram showing the change of the magnitude of the angular velocity vector of the head pose with time in a case where the nod motion is repeatedly performed.

When the reciprocating motion by the vertical rotation is repeatedly performed, the magnitude of the angular velocity vector changes with time as shown in FIG. 28. Therefore, the dynamic period detected by the dynamic period detecting unit 206 is alternately detected during downward and upward rotation motions as shown in FIG. 28. Furthermore, assuming that times when the magnitude of the angular velocity vector is maximized are (T1, T2, T3, . . . ) as shown in FIG. 28, the angular velocity vectors at these times are selected as representative angular velocity vectors for each dynamic period by the representative angular velocity vector calculating unit 207, and the selected representative angular velocity vectors are stored as time series data in order in the storage unit 208.

Here, the angular velocity vectors at the times T1, T3, T5 . . . are representative angular velocity vectors appearing during the downward rotation motion. On the other hand, the angular velocity vectors at T2, T4, . . . are representative angular velocity vectors appearing during the upward rotation motion. Therefore, in this case, the relative intersection angle θR between two representative angular velocity vectors every two representative angular velocity vectors stored in the storage unit 208 comes close to zero.

Then, first in the reciprocating motion detecting unit 209, a relative intersection angle θS is calculated which is formed between the representative angular velocity vectors successively stored in the storage unit 208. When the intersection angle θS is near 180 degrees, it is detected that the head pose coordinate has performed the reciprocating motion by rotation. This detection result is sent to the repetitive motion detecting unit 210.

Next, in the repetitive motion detecting unit 210, a relative intersection angle θR between two representative angular velocity vectors every two representative angular velocity vectors. At this time, when the intersection angle θR is near zero, it is detected that the head pose coordinate has repetitively performed its reciprocating motion. When this process is performed, it can be detected that the nod motion has been repeatedly performed. Specifically, the repetitive motion detecting unit 210 compares the intersection angle θR between the representative angular velocity vectors with the predetermined threshold value ΘR. When θR≦ΘR, it may be detected that the nod motion has been repeatedly performed.

The nod/shake detecting unit 211 detects whether the reciprocating motion detected by the reciprocating motion detecting unit 209 is the nod motion or the head shake motion.

The nod motion of the person who is the object can be grasped as the reciprocating motion of the head pose by the vertical rotation. The head shake motion can be grasped as the reciprocating motion by the horizontal rotation of the head pose.

Then, in a case where the representative angular velocity vector stored in the storage unit 208 is represented by $VR = (v\psi, v\phi)$, when $|v\psi| \leqq |v\phi|$, the head pose coordinate is largely displaced in the vertical direction, and therefore the reciprocating motion is detected to be the nod motion. Conversely, when $|v\psi| < |v\phi|$, the head pose coordinate is largely displaced in the horizontal direction, and therefore the reciprocating motion is detected as the head shake motion. Here, $|v\psi|$ represents a magnitude of a $\psi$-component of the representative angular velocity vector VR, and $|v\phi|$ represents a magnitudes of a $\phi$-component of the representative angular velocity vector VR.

Thus, according to the gesture detecting system of the second embodiment, it is detected whether or not the head pose coordinate performs the reciprocating or repetitive motion by the rotation based on the relative intersection angle formed by two representative angular velocity vectors of the head pose coordinate to thereby detect the gestures which are the nod motion or the head shake motion and the repetitive motion of the person who is the object.

It is to be noted that in the present embodiment, the nod motion or the head shake motion of the object is detected using only the head pose coordinate. For example, it may be detected that the nod motion or the head shake motion of the person who is the object exists simultaneously using the face central coordinate used in the first embodiment, for example, only in a case where both the results indicate the existence of the reciprocating motion. Thus, the gesture of the object can be detected using the head pose coordinate and the face central coordinate simultaneously to thereby detect the gesture with a higher precision.

Third Embodiment

In the first embodiment, the dynamic period detecting unit 106 detects a period in which the magnitude of the velocity vector calculated by the velocity vector calculating unit 105 is larger than the predetermined threshold value, and the representative velocity vector calculating unit 107 calculates the representative velocity vector from the velocity vectors included in the detected dynamic period.

In a third embodiment, a method will be described in which the time is detected when the magnitude of the velocity vector calculated by the velocity vector calculating unit 105 exceeds a predetermined threshold value, and a representative velocity vector is calculated from the velocity vectors included for a certain time period from the detected time to thereby detect a gesture.

Figure 29:
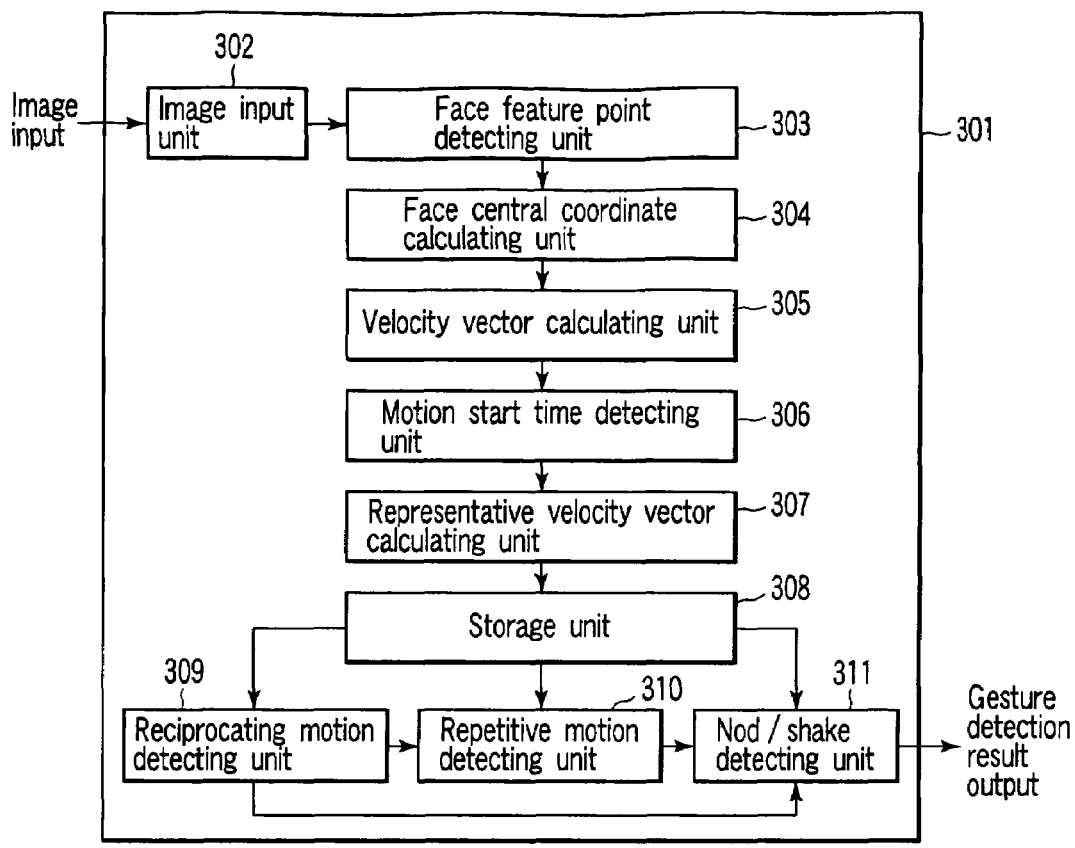
FIG. 29 is a block diagram showing an example of the functional arrangement of a gesture detecting system according to a third embodiment.

FIG. 29 shows an example of the functional arrangement of a gesture detecting system for realizing a gesture detecting method according to the third embodiment of the present invention.

A gesture detecting system 301 according to the third embodiment comprises: an image input unit 302; a face feature point detecting unit 303; a face central coordinate calculating unit 304; a velocity vector calculating unit 305; a motion start time detecting unit 306; a representative velocity vector calculating unit 307; a storage unit 308; a reciprocating motion detecting unit 309; a repetitive motion detecting unit 310; and a nod/shake detecting unit 311. Some or all of these constituting elements may be constituted by hardware or software.

Next, a constitution and an operation of the gesture detecting system 301 will be described according to the third embodiment. It is to be noted that description is omitted hereinafter with respect to parts (image input unit 302, face feature point detecting unit 303, face central coordinate calculating unit 304, velocity vector calculating unit 305, storage unit 308, repetitive motion detecting unit 310, nod/shake detecting unit 311) which are common to the gesture detecting system 101 according to the first embodiment.

The motion start time detecting unit 306 detects the time (motion start time) when a face central point starts its motion using a velocity vector of movement of the face central point sent from the velocity vector calculating unit 305. Here, the motion start time refers to the time when the magnitude of the velocity vector is larger than a predetermined threshold value, and the magnitude of the velocity vector at an immediately previous time is not more than the predetermined threshold value. That is, the motion start time is the time corresponding to a frame f which satisfies the condition shown in equation (15), for example, in a case where time series data of the velocity vector is represented by $\{V1, V2, \ldots, Vf, \ldots\}$.

$$\|Vf\| > THv$$
$$\|Vf-1\| \leqq THv \tag{15}$$

where THv is a predetermined threshold value of the magnitude of the velocity vector.

It is to be noted that in the equation (15), the condition is determined in such a manner that the velocity vector at the immediately previous time is the velocity vector of a frame before the frame indicating $\|Vf\| > THv$. However, it may be assumed that the velocity vector at the immediately previous time is the velocity vector of a predetermined N-th frame before the frame, and the time corresponding to the frame f which satisfies the condition represented by equation (16) is the motion start time.

$$\|Vf\| > THv$$
$$\|V_{f-N}\| \leqq THv \tag{16}$$

It is to be noted that in a case where successive frames satisfy the equation (16), for example, the time corresponding to the first frame may be assumed as the motion start time among the frames.

The motion start time detected by the motion start time detecting unit 306 is sent to the representative velocity vector calculating unit 307.

The representative velocity vector calculating unit 307 calculates a representative velocity vector from velocity vectors included in a period for a certain predetermined time period from the motion start time detected by the motion start time detecting unit 306. The representative velocity vector may be calculated from the velocity vectors included in the period of N frames from a frame fs corresponding to the motion start time detected by the motion start time detecting unit 306. Here, assuming that the velocity vectors included in the period for the N frames from the frame fs corresponding to the motion start time detected by the motion start time detecting unit 306 are {Vfs, Vfs+1, ..., Vfs+N}, and the representative velocity vector is VR, the representative velocity vector VR is a velocity vector which satisfies equation (17).

$$\|V_R\| > \|V_i\| (i = f_s, \ldots, f_s+N, i \ne R) \quad (17)$$

A velocity vector whose magnitude is maximum is assumed as the representative velocity vector VR among the velocity vectors included in the above-described period. However, the representative velocity vector VR may be an average vector of the velocity vectors included in the above-described period, and a velocity vector at a time after the N frames from the motion start time may be simply assumed as the representative velocity vector VR.

Thus, the representative velocity vector calculating unit 307 calculates the representative velocity vector VR every time the motion start time is detected by the motion start time detecting unit 306. Moreover, the representative velocity vector VR calculated by the representative velocity vector calculating unit 307 is stored as time series data in the storage unit 308.

The reciprocating motion detecting unit 309 successively reads out the representative velocity vectors stored in the storage unit 308, and the unit 309 detects from the read-out representative velocity vectors whether or not the face central point performs its reciprocating motion.

Figure 30:
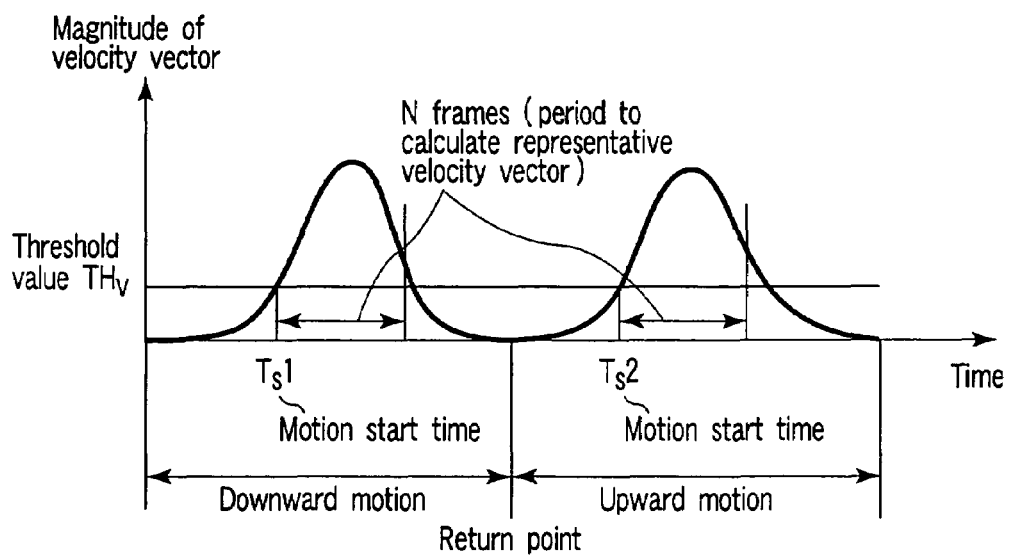
FIG. 30 is a diagram showing the change of the magnitude of the velocity vector of the face central point with time and a motion start time in the nod motion.

Here, in an example of a nod motion, the magnitude of the velocity vector of the movement of the face central point changes in the nod motion with time as shown in FIG. 30. Therefore, when a threshold value THv is set to an appropriate value with respect to the magnitude of the velocity vector in the motion start time detecting unit 306, as shown in FIG. 30, the motion start time (TS1, TS2) is detected by the motion start time detecting unit 306 once every downward or upward motion of the face central point in one nod motion. Therefore, assuming that a period to calculate the representative velocity vector corresponds to N frames from the motion start time detected by the motion start time detecting unit 306 in the representative velocity vector calculating unit 307, as shown in FIG. 30, periods to calculate the representative velocity vectors can be obtained during the downward and upward motions, respectively.

Here, directions of the velocity vectors included in these periods are all downward directions during the downward motion, and all upward directions during the upward motion. Therefore, when the representative velocity vector is calculated from each period in the representative velocity vector calculating unit 307, an intersection angle formed by both the velocity vectors comes close to 180 degrees.

Then, the reciprocating motion detecting unit 309 calculates the intersection angle between two successive representative velocity vectors stored in the storage unit 308. When the intersection angle is near 180 degrees, it is detected that the face central point has performed its reciprocating motion. That is, it can be detected that the nod motion has been performed.

As described above, according to the gesture detecting system of the third embodiment, the time is detected when the magnitude of the velocity vector of the movement of the face central point exceeds a predetermined threshold value, the representative velocity vector is obtained from the velocity vectors included in the period of the certain time from the detected time, and it is detected whether or not the face central point performs its reciprocating or repetitive motion. Consequently, the gesture of the person who is the object can be robustly detected with speed and precision.

Fourth Embodiment

In the first embodiment, the dynamic period detecting unit 106 detects a period in which the magnitude of the velocity vector calculated by the velocity vector calculating unit 105 is larger than the predetermined threshold value, and the representative velocity vector calculating unit 107 calculates the representative velocity vector from the velocity vectors included in the detected dynamic period.

In a fourth embodiment, a method will be described in which a static period is detected as time series data. In the static period, a magnitude of a velocity vector calculated by the velocity vector calculating unit 105 is smaller than a predetermined threshold value, and a face central point is supposed to stand still. A representative velocity vector is calculated from the velocity vectors included in a period between the detected static period and another static period to thereby detect a gesture.

Figure 31:
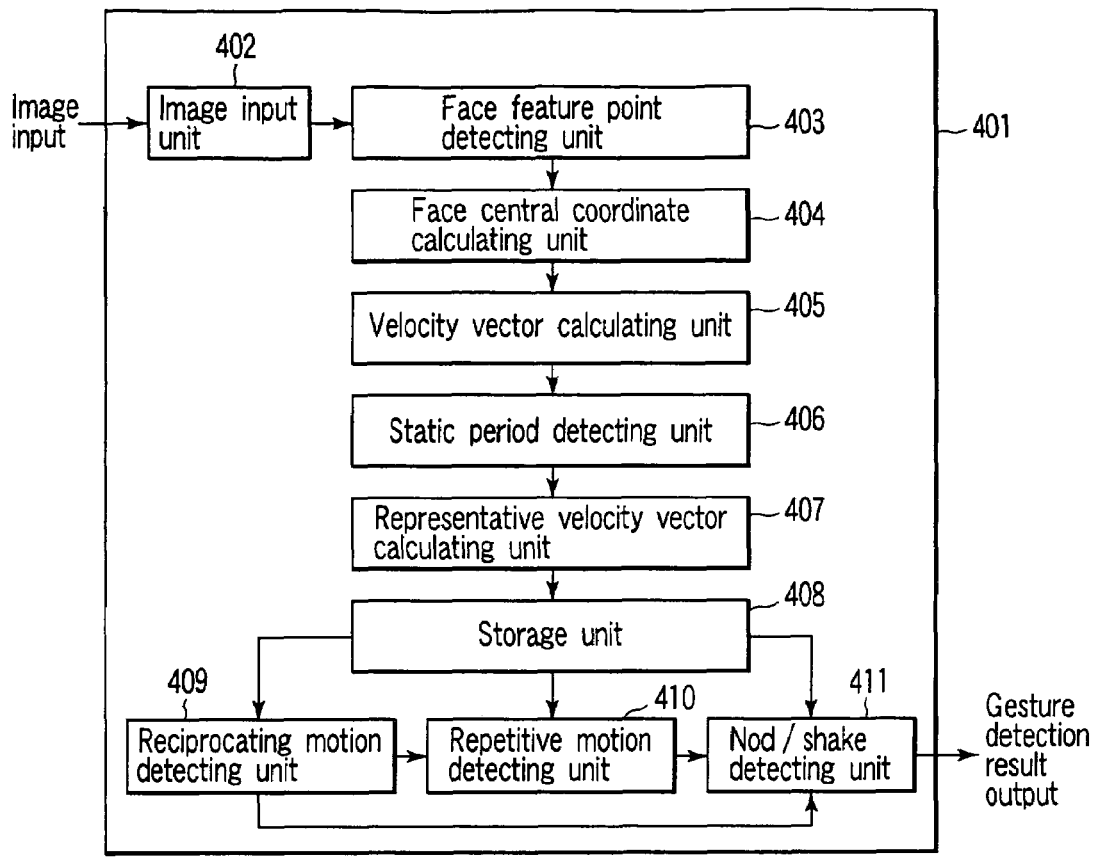
FIG. 31 is a block diagram showing an example of the functional arrangement of a gesture detecting system according to a fourth embodiment.

FIG. 31 shows an example of the functional arrangement of a gesture detecting system for realizing a gesture detecting method according to the fourth embodiment of the present invention.

A gesture detecting system 401 according to the fourth embodiment comprises: an image input unit 402; a face feature point detecting unit 403; a face central coordinate calculating unit 404; a velocity vector calculating unit 405; a static period detecting unit 406; a representative velocity vector calculating unit 407; a storage unit 408; a reciprocating motion detecting unit 409; a repetitive motion detecting unit 410; and a nod/shake detecting unit 411. Some or all of these constituting elements may be constituted by hardware or software.

Next, a constitution and an operation of the gesture detecting system 401 will be described according to the fourth embodiment. It is to be noted that description is omitted hereinafter with respect to parts (image input unit 402, face feature point detecting unit 403, face central coordinate calculating unit 404, velocity vector calculating unit 405, storage unit 408, repetitive motion detecting unit 410, nod/shake detecting unit 411) which are common to the gesture detecting system 101 according to the first embodiment.

The static period detecting unit 406 detects a time period (static period) in which a face central point stands still using a velocity vector of movement of the face central point sent from the velocity vector calculating unit 405. Here, the static period is a time period in which all magnitudes of velocity vectors included in the period are smaller than a predetermined threshold value. That is, the period refers to successive periods comprising a frame which satisfies a condition represented by equation (18) in a case where time series data of the velocity vector is represented by {V1, V2, ..., Vf, ...}.

$$\|V_f\| < THv \quad (18)$$

where THv is a predetermined threshold value of the magnitude of the velocity vector.

The static period detected by the static period detecting unit 406 is sent as time series data to the representative velocity vector calculating unit 407.

Figure 32:
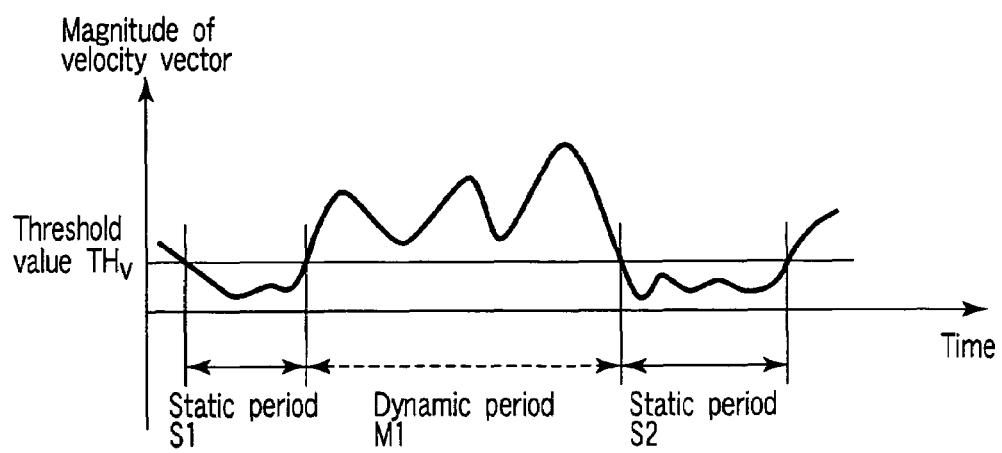
FIG. 32 is a diagram showing a relation between the change of the magnitude of the velocity vector with time, static period, and dynamic period.

The representative velocity vector calculating unit 407 receives the static period detected by the static period detecting unit 406, obtains as a dynamic period the periods included between two successive static periods, and calculates a representative velocity vector from velocity vectors included in the dynamic period. That is, as shown in FIG. 32, when two static periods S1, S2 are sent from the static period detecting unit 406, the representative velocity vector calculating unit detects a dynamic period M1 included between the static periods S1 and S2, and next calculates the representative velocity vector from the velocity vectors included in the dynamic period M1.

The representative velocity vector calculated by the representative velocity vector calculating unit 407 may be the velocity vector whose magnitude is maximum among the velocity vectors included in the dynamic period M1, the average vector of the velocity vectors included in the dynamic period M1, or the velocity vector of the frame corresponding to the center time of the dynamic period M1.

Thus, the representative velocity vector calculating unit 407 calculates the representative velocity vector from the velocity vectors included between the detected static period and another static period every time the static period is detected by the static period detecting unit 406. Moreover, the representative velocity vector calculated by the representative velocity vector calculating unit 407 is stored as time series data in the storage unit 408.

The reciprocating motion detecting unit 409 successively reads out the representative velocity vectors stored in the storage unit 408, and detects from the read-out representative velocity vectors whether or not a face central point performs its reciprocating motion.

Figure 33:
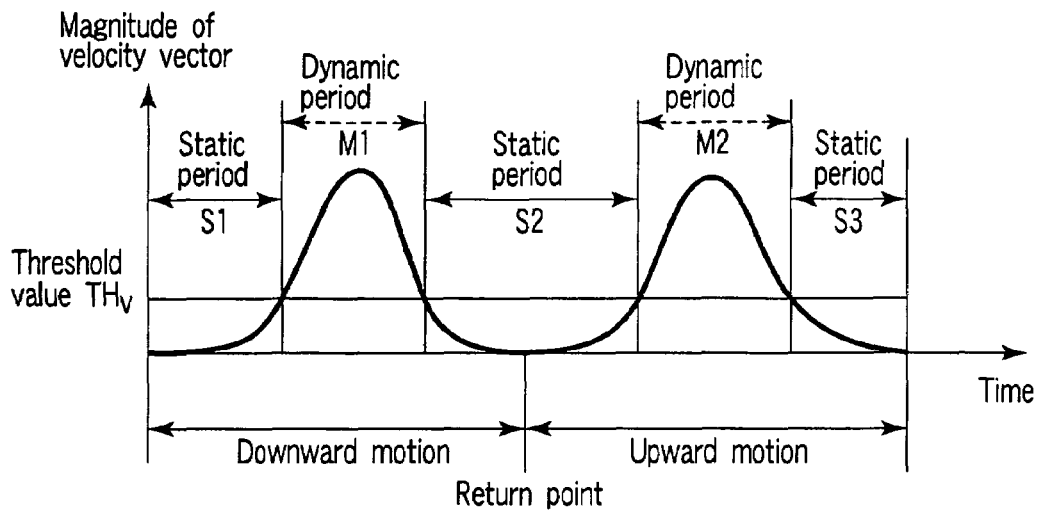
FIG. 33 is a diagram showing the change of the magnitude of the velocity vector of the face central point with time, static period, and dynamic period in the nod motion.

Here, in an example of a nod motion, the magnitude of the velocity vector of the movement of the face central point changes in the nod motion with time as shown in FIG. 33. Therefore, when a threshold value THv is set to an appropriate value with respect to the magnitude of the velocity vector in the static period detecting unit 406, as shown in FIG. 33, the static period detecting unit 406 detects three static periods: a time (S1) when a downward motion is started in one nod motion; a time (S2) when the downward motion shifts to an upward motion; and a time (S3) when the nod motion is completed, and the face central point returns to its original position to a standstill. Therefore, when the representative velocity vector calculating unit 407 detects as the dynamic period the period between two successive static periods detected by the static period detecting unit 406, as shown in FIG. 33, in one nod motion, two dynamic periods (M1, M2) are detected during the downward and upward motions.

Here, directions of the velocity vectors included in these dynamic periods M1, M2 are all downward directions during the downward motion, and all upward directions during the upward motion. Therefore, when the representative velocity vector is calculated from each dynamic period in the representative velocity vector calculating unit 407, the intersection angle formed by both the representative velocity vectors comes close to 180 degrees.

Then, the reciprocating motion detecting unit 409 calculates the intersection angle between two successive representative velocity vectors stored in the storage unit 408. When the intersection angle is near 180 degrees, it is detected that the face central point has performed its reciprocating motion. That is, it can be detected that the nod motion has been performed.

As described above, according to the gesture detecting system of the fourth embodiment, the period in which the velocity vector of the movement of the face central point is smaller than a predetermined threshold value is detected as the static period, the dynamic period included between two successive detected static periods is obtained as the dynamic period, the representative velocity vector is obtained from the velocity vectors included in the dynamic period, and it is detected whether or not the face central point performs its reciprocating or repetitive motion. Consequently, the gesture of the person who is the object can be robustly detected with speed and precision.

Fifth Embodiment

In the first embodiment, the dynamic period detecting unit 106 detects a period in which the magnitude of the velocity vector calculated by the velocity vector calculating unit 105 is larger than the predetermined threshold value, and the representative velocity vector calculating unit 107 calculates the representative velocity vector from the velocity vectors included in the detected dynamic period.

In a fifth embodiment, a method will be described in which a velocity vector of a time is detected when a magnitude of a velocity vector calculated by the velocity vector calculating unit 105 is larger than a predetermined threshold value and is maximized to thereby detect a gesture.

Figure 34:
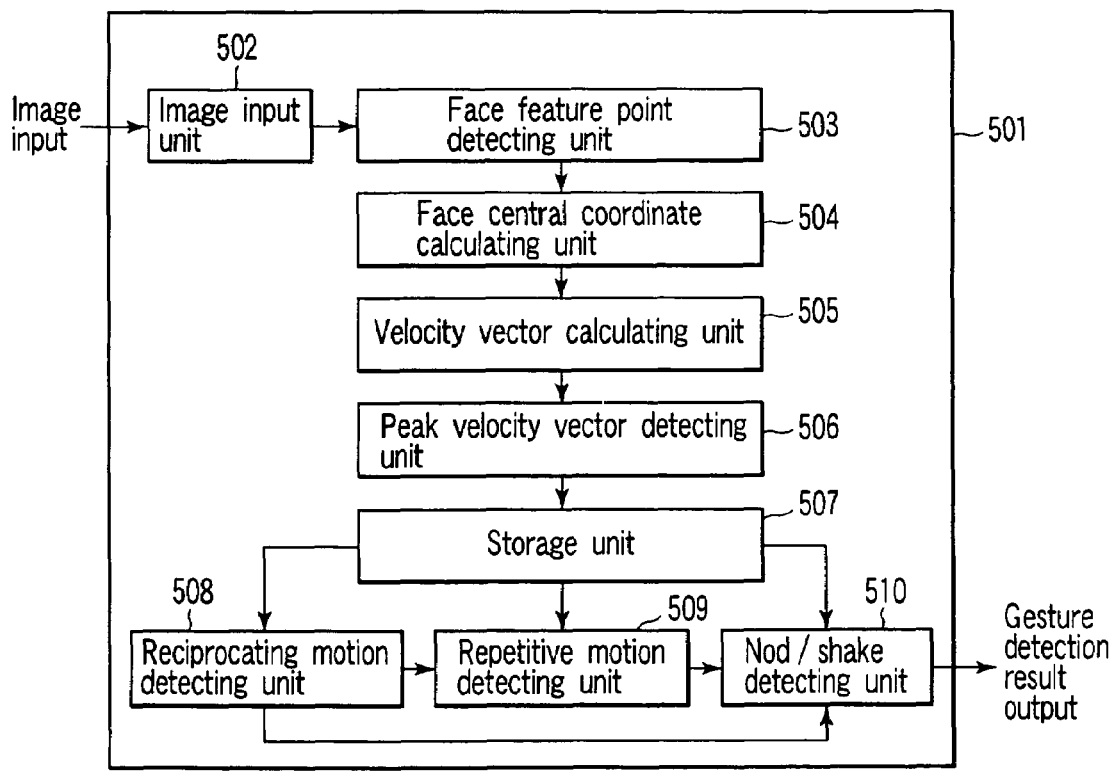
FIG. 34 is a block diagram showing an example of the functional arrangement of the gesture detecting system according to a fifth embodiment.

FIG. 34 shows an example of the functional arrangement of a gesture detecting system for realizing a gesture detecting method according to the fifth embodiment of the present invention.

A gesture detecting system 501 according to the fifth embodiment comprises: an image input unit 502; a face feature point detecting unit 503; a face central coordinate calculating unit 504; a velocity vector calculating unit 505; a peak velocity vector calculating unit 506; a storage unit 507; a reciprocating motion detecting unit 508; a repetitive motion detecting unit 509; and a nod/shake detecting unit 510. Some or all of these constituting elements may be constituted by hardware or software.

Next, a constitution and an operation of the gesture detecting system 501 will be described according to the fifth embodiment. It is to be noted that description is omitted hereinafter with respect to parts (image input unit 502, face feature point detecting unit 503, face central coordinate calculating unit 504, velocity vector calculating unit 505, storage unit 507, repetitive motion detecting unit 509, nod/shake detecting unit 510) which are common to the gesture detecting system 101 according to the first embodiment.

The peak velocity vector calculating unit 506 detects a velocity vector (peak velocity vector) of a time when the magnitude of the velocity vector is larger than the predetermined threshold value and is maximized using the velocity vector of the movement of the face central point sent from the velocity. vector calculating unit 505. Here, the time when the magnitude of the velocity vector is maximized refers to a time when the magnitude of the velocity vector at the time is locally maximum, that is, the magnitude is maximum in an appropriate range around the time. Therefore, the peak velocity vector can be obtained as the velocity vector of a frame which satisfies a condition represented by equation (19) in a case where time series data of the velocity vector is represented by $\{V1, V2, \ldots, Vf, \ldots\}$.

$$\|V_f\| > TH_v$$

$$\|V_f\| > \|V_{f-1}\|$$

$$\|V_f\| > \|V_{f+1}\| \quad (19)$$

where THv is a predetermined threshold value of the magnitude of the velocity vector.

It is to be noted that in the equation (19), the magnitudes of the velocity vectors of three successive frames are compared to obtain the peak velocity vector. Alternatively, in consideration of a case where the magnitudes of the velocity vectors of a plurality of successive frames are equal, the velocity vectors of the successive frames having an equal size and satisfying a condition represented by equation (20) are obtained, and one of the vectors may be obtained as the peak velocity vector.

$$\|V_f\| > TH_v$$

$$\|V_f\| > \|V_{f-N}\|, \|V_f\| = \|V_{f-i}\|(i=1,\ldots,N-1)$$

$$\|V_f\| > \|V_{f+M}\|, \|V_f\| = \|V_{f+i}\|(i=1,\ldots,M-1) \quad (20)$$

Moreover, in the equation (19), the vector having a maximum magnitude is obtained as the peak velocity vector from the velocity vectors of three successive frames. However, even if the velocity vector of the time when the magnitude locally becomes substantially maximum is obtained as the peak velocity vector like Vf−1 or Vf+1, the vector is within the scope of the present invention.

Thus, the peak velocity vector detected by the peak velocity vector calculating unit 506 is sent to the storage unit 507, and stored as time series data in the storage unit 507.

The reciprocating motion detecting unit 508 successively reads out the peak velocity vectors stored in the storage unit 507, and detects from the peak velocity vectors whether or not a face central point performs its reciprocating motion.

Figure 35:
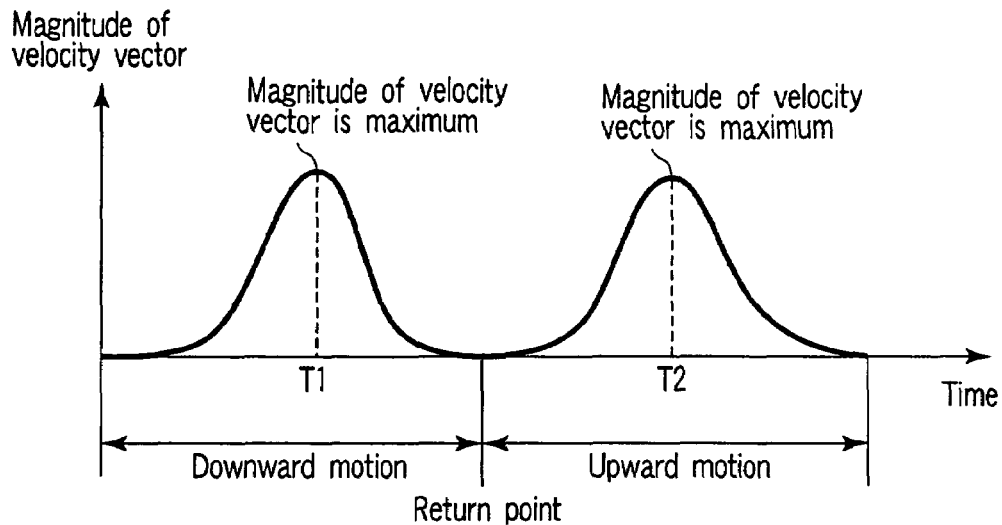
FIG. 35 is a diagram showing the change of the magnitude of the velocity vector of the face central point with time in the nod motion, and a time when the velocity vector is maximized.

Here, in an example of a nod motion, the magnitude of the velocity vector of the movement of the face central point changes in the nod motion with time as shown in FIG. 35. Therefore, when a threshold value THv is set to be appropriate with respect to the magnitude of the velocity vector, as shown in FIG. 35, the peak velocity vector calculating unit 506 detects each peak velocity vector during each of the downward motion (T1) and the upward motion (T2) of the face central point in one nod motion. The peak velocity vectors are stored in order in the storage unit 507.

Moreover, directions of the peak velocity vectors in the times T1, T2 stored in the storage unit 507 are downward directions in the time T1, and upward directions in the time T2. Therefore, when an intersection angle formed by both the velocity vectors is calculated, the angle comes close to 180 degrees.

Then, the intersection angle between two successive peak velocity vectors stored in the storage unit 508 is calculated. When the intersection angle is near 180 degrees, it is detected that the face central point has performed its reciprocating motion. That is, it can be detected that the nod motion has been performed.

As described above, according to the gesture detecting system of the fifth embodiment, the velocity vector in the time when the velocity vector of the movement of the face central point is larger than the predetermined threshold value and is maximized is detected as the peak velocity vector, and it is detected whether or not the face central point performs its reciprocating or repetitive motion. Consequently, the gesture of the person who is the object can be robustly detected with speed and precision.

Sixth Embodiment

In the first embodiment, the dynamic period detecting unit 106 detects a period in which the magnitude of the velocity vector calculated by the velocity vector calculating unit 105 is larger than the predetermined threshold value.

In a sixth embodiment, a method will be described in which a dynamic period is detected using time series data of a face central coordinate obtained by the face central coordinate calculating unit 104.

Figure 36:
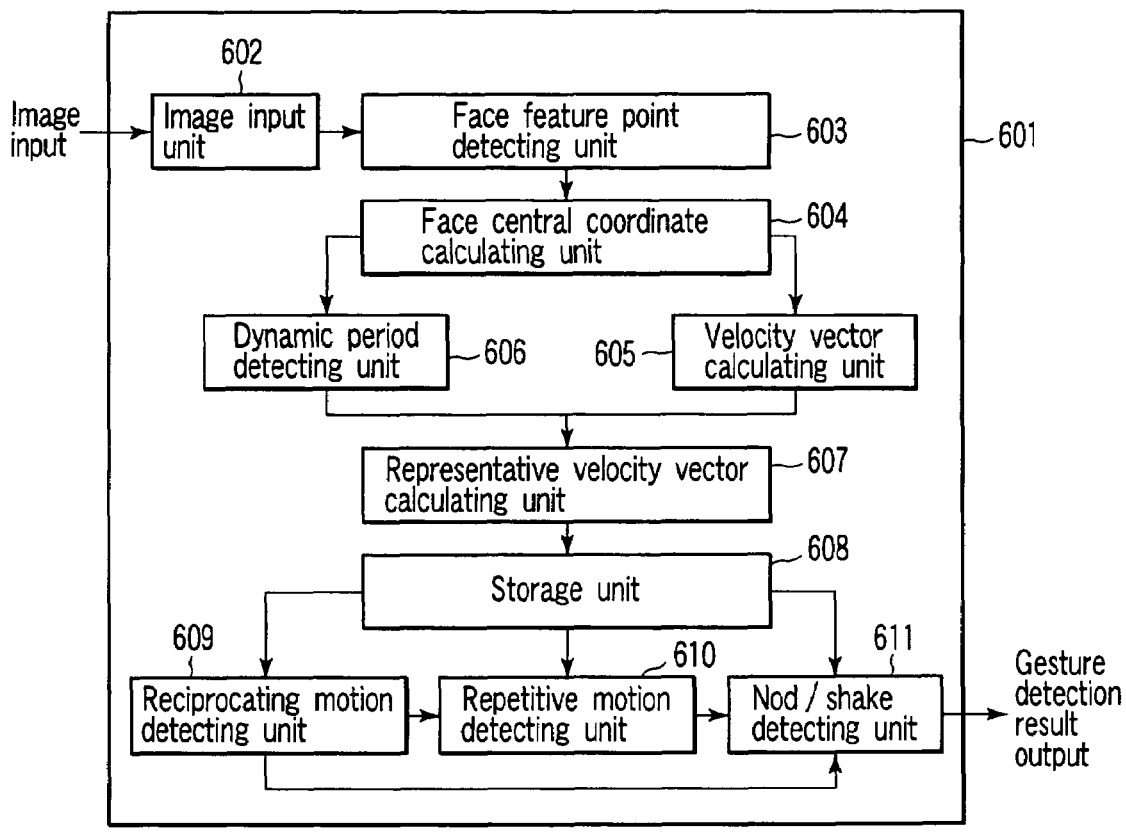
FIG. 36 is a block diagram showing an example of the functional arrangement of a gesture detecting system according to a sixth embodiment.

FIG. 36 shows an example of the functional arrangement of a gesture detecting system for realizing a gesture detecting method according to the sixth embodiment of the present invention.

A gesture detecting system 601 according to the sixth embodiment comprises: an image input unit 602; a face feature point detecting unit 603; a face central coordinate calculating unit 604; a velocity vector calculating unit 605; a dynamic period detecting unit 606; a representative velocity vector calculating unit 607; a storage unit 608; a reciprocating motion detecting unit 609; a repetitive motion detecting unit 610; and a nod/shake detecting unit 611. Some or all of these constituting elements may be constituted by hardware or software.

Next, a constitution and an operation of the gesture detecting system 601 will be described according to the sixth embodiment. It is to be noted that description is omitted hereinafter with respect to parts (image input unit 602, face feature point detecting unit 603, storage unit 608, reciprocating motion detecting unit 609, repetitive motion detecting unit 610, nod/shake detecting unit 611) which are common to the gesture detecting system 101 according to the first embodiment.

The face central coordinate calculating unit 604 calculates a face central coordinate from coordinates of right and left nostrils sent from the face feature point detecting unit 603, and sends the coordinate to the velocity vector calculating unit 605 and the dynamic period detecting unit 606.

The velocity vector calculating unit 605 calculates the velocity vector of the movement of the face central point for each frame from the face central coordinate sent from the face central coordinate calculating unit 604. Next, the velocity vector obtained by the velocity vector calculating unit 605 is sent to the representative velocity vector calculating unit 607.

The dynamic period detecting unit 606 detects a period in which a magnitude of displacement per unit time of the face central coordinate is larger than a predetermined threshold value from time series data of the face central coordinate sent from the face central coordinate calculating unit 604, as a dynamic period. That is, when the face central coordinate of the f-th frame is represented by (xf, yf), the dynamic period detecting unit 606 detects the dynamic periods which include successive periods comprising each frame f which satisfies a condition represented by equation (21).

$$\frac{\sqrt{(x_{f+n}-x_f)^2+(y_{f+n}-y_f)^2}}{\Delta t} > TH_p \quad (21)$$

where n denotes a parameter indicating an interval between two frames to calculate the displacement of the face central coordinate. Moreover, Δt denotes a unit time, and the unit time is a time interval between a time when the f-th frame is captured and a time when the f+n-th frame is captured. Furthermore, THp denotes a threshold value with respect to a magnitude of the displacement per unit time of the predetermined face central coordinate.

It is to be noted that in a case where the unit time Δt is kept to be constant in each frame and the magnitude of the displacement per unit time is obtained, the dynamic period may be detected using equation (22).

$$(x_{f+n}-x_f)^2+(y_{f+n}-y_f)^2 > TH_p \quad (22)$$

Furthermore, in consideration of a track of the displacement between the respective frames, the dynamic period may be detected using equation (23).

$$\sum_{i=0}^{n-1}[(x_{f+1+i}-x_{f+i})^2+(y_{f+1+i}-y_{f+i})^2] > TH_P \quad (23)$$

The dynamic period detected by the dynamic period detecting unit 606 in this manner is sent to the representative velocity vector calculating unit 607.

The representative velocity vector calculating unit 607 calculates a representative velocity vector from velocity vectors included in the dynamic period among the velocity vectors sent from the velocity vector calculating unit 605 with respect to the respective dynamic periods detected by the dynamic period detecting unit 606.

Thus, according to the gesture detecting system of the sixth embodiment, the dynamic period can be detected from the magnitude of the displacement per unit time of the face central point. It is possible to robustly detect the gestures which are the nod motion, head shake motion, and repetitive motion of the person who is the object with speed and precision in the same manner as in the gesture detecting system according to the first embodiment.

As described above, according to the embodiments, the reciprocating and repetitive motions of the specific part of the object which is a detection object performing the gesture are detected based on a relation between the velocity vectors of the specific part of the object. Consequently, the gesture can be robustly detected with speed and precision without using any standard pattern of the gesture of the detection object.

What is claimed is:

1. A gesture detecting method implemented by a computer programmed as a gesture-detecting apparatus, the method comprising:
   calculating, by the computer, a velocity vector of a specific part of an object gesturing, from time series data of coordinates of the specific part, to obtain a time-series velocity vectors;
   detecting dynamic periods when displacement per unit time of the specific part is larger than a displacement threshold value, based on the time-series velocity vectors;
   acquiring a representative velocity vector from velocity vectors in each dynamic period;
   storing each representative velocity vector corresponding to each dynamic period in a storage unit;
   calculating a first intersection angle of two representative velocity vectors stored in the storage unit, the two representative velocity vectors corresponding to two successive dynamic periods; and
   detecting that a motion of the specific part is a reciprocating motion when the first intersection angle is larger than a first threshold value.

2. The method according to claim 1, wherein the detecting the dynamic periods detects the dynamic periods when magnitudes of the velocity vectors are larger than a velocity threshold value.

3. The method according to claim 1, further comprising:
   calculating a second intersection angle of two representative velocity vectors stored in the storage unit, the two representative velocity vectors corresponding to two dynamic periods every two dynamic periods; and
   detecting that the motion of the specific part is a repetitive motion which is a motion repeating the reciprocating motion, when the first intersection angle is larger than the first threshold value and the second intersection angle is smaller than a second threshold value.

4. The method according to claim 1, wherein the representative velocity vector is one of the velocity vectors in each dynamic period, a magnitude of the representative velocity vector being the largest one of the velocity vectors in the each dynamic period.

5. The method according to claim 1, wherein the representative velocity vector is an average velocity vector of the velocity vectors in the each dynamic period.

6. The method according to claim 1, wherein the representative velocity vector is a velocity vector at a central time of the each dynamic period.

7. The method according to claim 1, wherein the time series data of coordinates is time series data of coordinates of a head of the object gesturing.

8. The method according to claim 1, wherein the velocity vector is an angular velocity vector.

9. The method according to claim 1, wherein the detecting each dynamic period includes:
   detecting a time point when a magnitude of one of the time series velocity vectors is larger than a velocity threshold value and a magnitude of another of the time series velocity vectors immediately prior to the one of the time series velocity vectors is smaller than the velocity threshold value; and
   acquiring the dynamic period which starts at the time point and is a predetermined amount of time.

10. The method according to claim 1, wherein the detecting each dynamic period includes detecting each static period when magnitudes of the velocity vectors are smaller than or equal to a velocity threshold value; and
    detecting the dynamic period which is between two successive static periods.

11. A gesture detecting method implemented by a computer programmed as a gesture-detecting apparatus, the method comprising:
    calculating, by the computer, a velocity vector of a specific part of an object gesturing, from time series data of coordinates of the specific part, to obtain time-series velocity vectors;
    detecting a representative velocity vector whose magnitude is larger than a velocity threshold value and a maximum, from the time-series velocity vectors, to obtain time-series representative velocity vectors;
    storing the time-series representative velocity vectors in a storage unit;
    calculating a first intersection angle of two successive representative velocity vectors stored in the storage unit; and
    detecting that a motion of the specific part is a reciprocating motion when the first intersection angle is larger than a first threshold value.

12. The method according to claim 11, further comprising:
    calculating a second intersection angle of two representative velocity vectors every two representative velocity vectors stored in the storage unit; and
    detecting that the motion of the specific part is a repetitive motion, which is a motion repeating the reciprocating motion, when the first intersection angle is larger than the first threshold value and the second intersection angle is smaller than a second threshold value.

13. A computer readable storage medium storing a computer program for causing a computer to perform a method having steps of:

calculating a velocity vector of a specific part of an object gesturing, from time series data of coordinates of the specific part, to obtain time-series velocity vectors;

detecting dynamic periods when displacement per unit time of the specific part is larger than a displacement threshold value, based on the time-series velocity vectors;

acquiring a representative velocity vector from velocity vectors in each dynamic period;

storing each representative velocity vector corresponding to each dynamic period in a storage unit;

calculating a first intersection angle of two representative velocity vectors corresponding to two successive dynamic periods stored in the storage unit; and detecting that a motion of the specific part is a reciprocating motion when the first intersection angle is larger than a first threshold value.

14. The computer readable storage medium of claim 13, the method further comprising:

calculating a second intersection angle of two representative velocity vectors stored in the storage medium, the two representative velocity vectors corresponding to two dynamic periods every two dynamic periods; and detecting that the motion of the specific part is a repetitive motion, which is a motion repeating the reciprocating motion, when the first intersection angle is larger than the first threshold value and the second intersection angle is smaller than a second threshold value.

15. A gesture detecting apparatus, comprising:

a first calculating unit configured to calculating a velocity vector of a specific part of an object gesturing, from time series data of coordinates of the specific part, to obtain time-series velocity vectors;

a first detecting unit configured to detect dynamic periods when displacement per unit time of the specific part is larger than a displacement threshold value, based on the time-series velocity vectors;

an acquiring unit configured to acquire a representative velocity vector from velocity vectors in each dynamic period;

a storage unit to store each representative velocity vector corresponding to each dynamic period;

a second calculating unit configured to calculate a first intersection angle of two representative velocity vectors corresponding to two successive dynamic periods; and a second detecting unit configured to detect that a motion of the specific part is a reciprocating motion when the first intersection angle is larger than a first threshold value wherein the above units are implemented in hardware or hardware/software combination.

16. The apparatus according to claim 15, further comprising:

a third calculating unit configured to calculate a second intersection angle of two representative velocity vectors corresponding to two dynamic periods every two dynamic periods;

a third detecting unit configured to detect that the motion of the specific part is a repetitive motion, which is a motion repeating the reciprocating motion, when the first intersection angle is larger than the first threshold value and the second intersection angle is smaller than a second threshold value.

* * * * *